(12) United States Patent
Achtelik et al.

(10) Patent No.: US 10,901,420 B2
(45) Date of Patent: Jan. 26, 2021

(54) UNMANNED AERIAL VEHICLE-BASED SYSTEMS AND METHODS FOR AGRICULTURAL LANDSCAPE MODELING

(71) Applicant: Intel Corporation, Santa Clara, CA (US)

(72) Inventors: Markus Achtelik, Wörthsee (DE); Jan Stumpf, Planegg (DE); Daniel Gurdan, Germering (DE); Bastian Jaeger, Munich (DE)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 15/803,141

(22) Filed: Nov. 3, 2017

(65) Prior Publication Data

US 2018/0129879 A1    May 10, 2018

Related U.S. Application Data

(60) Provisional application No. 62/433,731, filed on Dec. 13, 2016, provisional application No. 62/418,141, filed on Nov. 4, 2016.

(51) Int. Cl.
*G01C 23/00* (2006.01)
*G05D 1/00* (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC .... G05D 1/0094; G05D 1/0219; G05D 1/104; B64C 39/024; B64D 47/08; G01C 5/00; G01C 11/06; G01C 11/02; A01B 76/00
(Continued)

(56) References Cited

U.S. PATENT DOCUMENTS 5,243,370 A    9/1993  Slater
5,801,948 A    9/1998  Wood et al.
(Continued)

FOREIGN PATENT DOCUMENTS

WO    2012024516    2/2012
WO    2015143173    9/2015

OTHER PUBLICATIONS

United States Patent and Trademark Office, "Final Office Action," issued in connection with U.S. Appl. No. 15/803,136, dated Apr. 6, 2020, 9 pages.
(Continued)

*Primary Examiner* — Mahmoud S Ismail
(74) *Attorney, Agent, or Firm* — Hanley, Flight & Zimmerman, LLC

(57) ABSTRACT

Unmanned aerial vehicle-based systems and methods for agricultural landscape modeling are disclosed herein. An example unmanned aerial vehicle includes a communicator to receive an instruction to request the unmanned aerial vehicle to fly over an area of interest. The instruction is from a vehicle in the area of interest. The unmanned aerial vehicle is to fly over the area of interest. The example unmanned aerial vehicle includes a camera to generate image data for the area of interest. The example unmanned aerial vehicle includes a data generator to generate a vegetation landscape model of the area of interest based on the image data. The communicator is to communicate the vegetation landscape model to the vehicle.

19 Claims, 10 Drawing Sheets

(51) Int. Cl.
| | |
|---|---|
| *G05D 3/00* | (2006.01) |
| *G06F 7/00* | (2006.01) |
| *G06F 17/00* | (2019.01) |
| *G06T 17/05* | (2011.01) |
| *B64C 39/02* | (2006.01) |
| *G01C 11/02* | (2006.01) |
| *G01C 11/06* | (2006.01) |
| *G05D 1/10* | (2006.01) |
| *B64D 47/08* | (2006.01) |
| *G01C 5/00* | (2006.01) |
| *G06K 9/00* | (2006.01) |
| *A01B 79/02* | (2006.01) |

(52) U.S. Cl.
CPC ............... *G01C 5/00* (2013.01); *G01C 11/02* (2013.01); *G01C 11/06* (2013.01); *G05D 1/104* (2013.01); *G06K 9/00657* (2013.01); *G06T 17/05* (2013.01); *A01B 79/02* (2013.01); *B64C 2201/123* (2013.01); *B64C 2201/127* (2013.01); *B64C 2201/146* (2013.01)

(58) Field of Classification Search
USPC .......................................................... 701/3
See application file for complete search history.

(56) References Cited

U.S. PATENT DOCUMENTS

| | | | |
|---|---|---|---|
| 5,884,205 A | 3/1999 | Elmore et al. | |
| 5,911,362 A | 6/1999 | Wood et al. | |
| 7,706,979 B1 | 4/2010 | Herwitz | |
| 8,972,357 B2 | 3/2015 | Shim et al. | |
| 9,369,982 B2 | 6/2016 | Yang et al. | |
| 9,392,746 B2 | 7/2016 | Darr et al. | |
| 9,681,320 B2 | 6/2017 | Johnson et al. | |
| 9,772,395 B2 | 9/2017 | Park et al. | |
| 9,824,596 B2 | 11/2017 | Arbeit et al. | |
| 10,301,019 B1 | 5/2019 | Canavor et al. | |
| 10,416,668 B2 | 9/2019 | Hammond et al. | |
| 10,571,546 B2 | 2/2020 | Park et al. | |
| 2006/0028552 A1 | 2/2006 | Aggarwal et al. | |
| 2007/0159476 A1* | 7/2007 | Grasnick | H04N 13/275 345/419 |
| 2011/0137547 A1 | 6/2011 | Kwon et al. | |
| 2014/0316616 A1 | 10/2014 | Kugelmass | |
| 2015/0018018 A1 | 1/2015 | Shen et al. | |
| 2015/0092048 A1 | 4/2015 | Brunner et al. | |
| 2015/0145954 A1 | 5/2015 | Pulleti et al. | |
| 2015/0378015 A1 | 12/2015 | You et al. | |
| 2015/0379702 A1* | 12/2015 | Ulman | G06T 7/0002 348/207.1 |
| 2016/0050840 A1* | 2/2016 | Sauder | G05D 1/0094 701/3 |
| 2016/0124435 A1 | 5/2016 | Thompson | |
| 2016/0292872 A1 | 10/2016 | Hammond et al. | |
| 2016/0313736 A1 | 10/2016 | Schultz et al. | |
| 2017/0015416 A1* | 1/2017 | O'Connor | B64C 39/024 |
| 2017/0031365 A1* | 2/2017 | Sugumaran | B64C 39/024 |
| 2017/0063998 A1* | 3/2017 | Fink | H04L 65/607 |
| 2017/0090007 A1 | 3/2017 | Park et al. | |
| 2017/0193828 A1 | 7/2017 | Boltzmann et al. | |
| 2017/0247108 A1 | 8/2017 | Ljubuncic et al. | |
| 2017/0299404 A1 | 10/2017 | Wang et al. | |
| 2017/0351005 A1 | 12/2017 | Alvarez et al. | |
| 2017/0355458 A1 | 12/2017 | Chen et al. | |
| 2018/0042174 A1 | 2/2018 | Li et al. | |
| 2018/0061148 A1 | 3/2018 | Dudar et al. | |
| 2018/0092295 A1 | 4/2018 | Sugumaran et al. | |
| 2018/0129210 A1 | 5/2018 | Achtelik et al. | |
| 2018/0196118 A1 | 7/2018 | Park et al. | |
| 2018/0372841 A1 | 12/2018 | Hieida et al. | |
| 2019/0026531 A1 | 1/2019 | Alvarez Gonzalez et al. | |

OTHER PUBLICATIONS

United States Patent and Trademark Office, "Non-Final Office Action," issued in connection with U.S. Appl. No. 15/803,136, dated Oct. 21, 2019, 11 pages.

United States Patent and Trademark Office, "Notice of Allowance," issued in connection with U.S. Appl. No. 15/803,136, dated Jul. 1, 2020, 9 pages.

Wikipedia, "Wi-Fi positioning system," https://en.wikipedia.org/wiki/Wi-Fi.sub.—positioning.sub.--system#cite.s- ub.--note-1, accessed Sep. 24, 2015, 3 pages.

Wikipedia, "Indoor positioning system," https://en.wikipedia.org/wiki/Indoor.sub.--positioning.sub.—system, accessed Sep. 24, 2015, 10 pages.

Wikipedia, "Video tracking," https://en.wikipedia.org/wiki/Video.sub.--tracking, accessed Sep. 24, 2015, 4 pages.

Wikipedia, "Feature extraction," https://en.wikipedia.org/wiki/Feature.sub.—extraction, accessed Sep. 24, 2015, 3 pages.

Wikipedia, "Homography," https://en.wikipedia.org/wiki/Homography.sub.--%28computersub.—vision%2- 9, accessed Sep. 24, 2015, 3 pages.

Betke et al., "Tracking Large Variable Numbers of Objects in Clutter," Department of Computer Science, Department of Biology, Boston University, Department of Mechanical Engineering, Massachusetts Institute of Technology, IEEE 2007, 8 pages.

Redzic, "Dual-sensor fusion for seamless indoor user localisation and tracking," A Dissertation Presented to the Faculty of Engineering and Computing of Dublin City University, Sep. 2012, 182 pages.

Navarro et al., "Wi-Fi Localization Using RSSI Fingerprinting," California Polytechnic State University, San Luis Obispo, CA, 6 pages.

United States Patent and Trademark Office, "Notice of Allowance," issued in connection with U.S. Appl. No. 15/803,136, dated Oct. 20, 2020, 10 pages.

* cited by examiner

UNMANNED AERIAL VEHICLE-BASED SYSTEMS AND METHODS FOR AGRICULTURAL LANDSCAPE MODELING

RELATED APPLICATIONS

This patent claims priority to U.S. Provisional Patent Application Ser. No. 62/418,141, filed on Nov. 4, 2016, under 35 U.S.C. § 119(e). This patent also claims priority to U.S. Provisional Patent Application Ser. No. 62/433,731, filed on Dec. 13, 2016, under 35 U.S.C. § 119(e). U.S. Provisional Patent Application Ser. No. 62/418,141 and U.S. Provisional Patent Application Ser. No. 62/433,731 are hereby incorporated by reference in their entireties.

FIELD OF THE DISCLOSURE

This disclosure relates generally to unmanned aerial vehicles, and, more particularly, to unmanned aerial vehicle-based systems and related methods for agricultural landscape modeling.

BACKGROUND

Normalized difference vegetation index (NDVI) data is used to identify an area including vegetation such as plants based on reflection of visible and near-infrared light (e.g., sunlight) by the plants. Differences in reflections of visible light and near-infrared light can be used to determine whether, for example, the area includes a dense population of plants or is an area that is sparse on vegetation, such as grassland.

In the agricultural industry, agricultural spraying and other modes of distribution are used to distribute fertilizers (e.g., nitrogen sprays) and/or other chemicals such as pesticides to, for example, protect crops from insects and disease. Data regarding an amount and/or condition of vegetation in an area can be used by, for example, a farmer, to apply agricultural chemicals to the crops.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
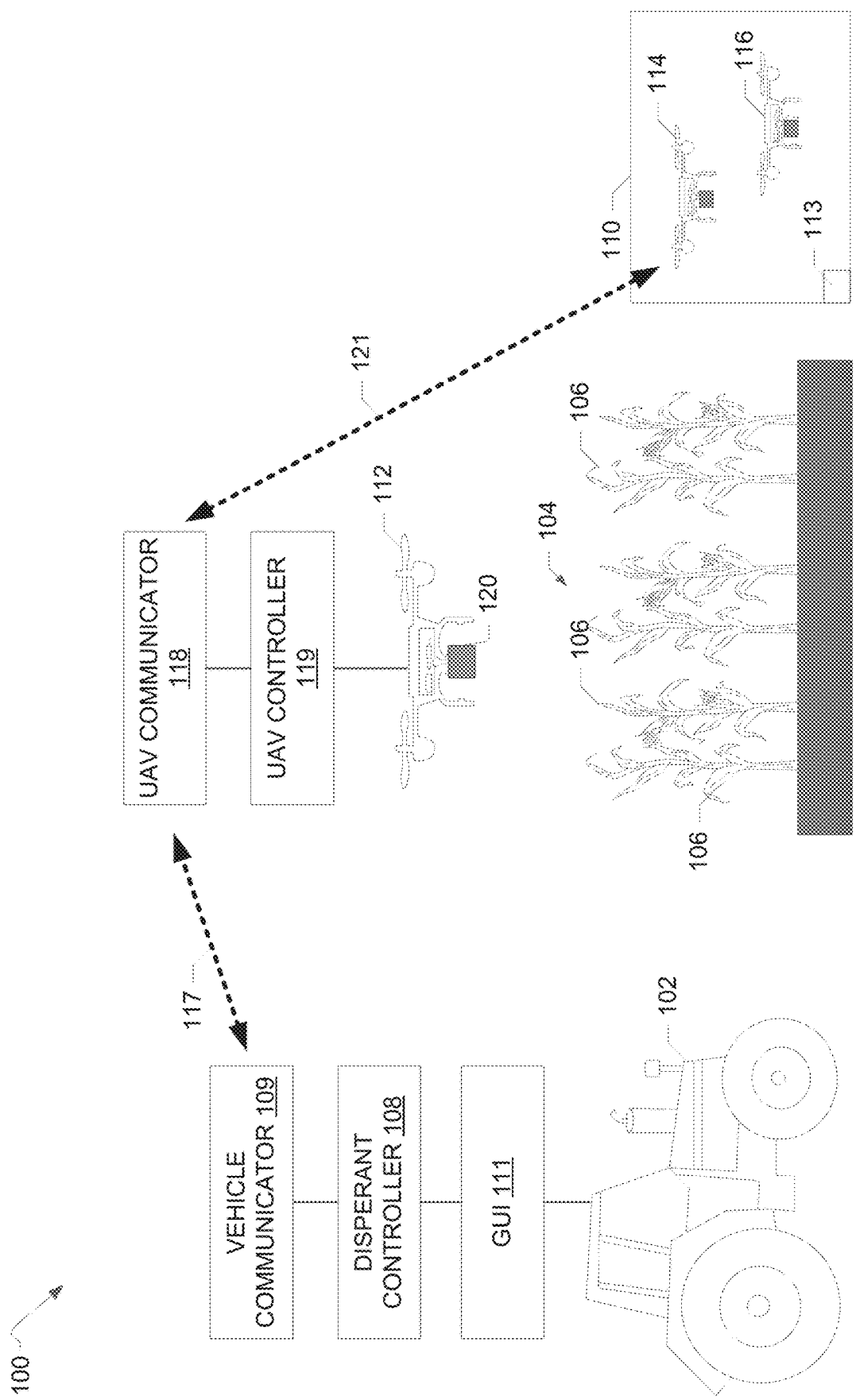
FIG. 1 illustrates an example system constructed in accordance with the teachings disclosed herein and located in an example environment of use.

Material treatment of crops includes applying one or more materials such as chemicals, fertilizers, pesticides, etc. on the crops to deliver nutrients to promote crop growth and/or to prevent damage to the crops from diseases or insects. Agricultural chemical treatments are typically applied via an aircraft or a land vehicle such as a tractor.

Normalized difference vegetation index (NDVI) data can be used to identify an amount of vegetation in an area and/or a condition (e.g., a health) of the vegetation based on reflection of visible light and near-infrared light by plants. NDVI data can be used by, for example, a farmer to determine where to distribute agricultural material treatments (e.g., chemicals) in an area such as a crop field during spraying. NDVI data can be generated based on image data collected by a camera. For example, a two-dimensional (2-D) image of the area of interest can be generated based on NDVI data as a representation of an amount of vegetation in the area. However, historical NDVI data used to create the image may not reflect a current state of vegetation in the area. Also, agricultural treatment materials may be over-applied or under-applied to the vegetation due to inaccuracies by, for example, the farmer in mapping the NDVI-based image to the area of interest during application of the materials. As a result, a farmer may have to re-apply the materials, which can result in inefficient distribution of the materials as well as increased costs. Also, cameras used to collect the NDVI data can be heavy and/or cumbersome to operate via, for example, a tractor or other platform.

Example systems and methods disclosed herein generate NDVI data in substantially real-time via one or more unmanned aerial vehicles (e.g., drones) deployed over an area of interest such as a crop field. Example unmanned aerial vehicles (UAV) disclosed herein include one or more cameras that generate image data as the UAVs fly over the area. Some examples disclosed herein generate the NDVI data based on the image data collected by the camera(s). In some such examples, a three-dimensional (3-D) image of the area of interest is generated based on the NDVI data. In disclosed examples, the NDVI data is transmitted in substantially real-time from the UAVs to a controller of, for example, a vehicle such as a tractor that distributes agricultural treatment materials. As used herein, the term "treatment material" refers to one or more elements, chemicals, fertilizers, biological agents, pesticides, or the like to be applied to vegetation. In some examples, the controller uses the NDVI data to identify a location within the area to distribute the treatment material(s), to select the treatment material(s) to be applied by the vehicle, and/or to determine an amount of the treatment material(s) to be applied.

In some examples disclosed herein, one or more instructions to the UAV(s) are received as user input entered via the controller of the vehicle and transmitted to the UAV(s). For example, a user can define an area over which the UAV(s) are to be deployed via the controller of the vehicle. Based on the instructions received from the vehicle controller, the UAV(s) can be deployed over the area of interest (e.g., automatically take off from a launch pad, collect images of the identified area, and return to the launch pad) to collect image data to generate the NDVI data. In some disclosed examples, the UAV(s) can be monitored or tracked via the vehicle controller. Some disclosed examples include a launch pad that can be installed proximate to an area of interest (e.g., a crop field) or on the vehicle for on-demand deployment of the UAV(s) when the crops are to be treated.

Although examples disclosed herein are discussed in the context of agricultural treatment, teachings disclosed herein can be utilized in other applications such as identifying road conditions for snow removal purposes. As such, the discussion of agricultural treatment is for illustrative purposes only and does not limit this disclosure to agricultural applications.

FIG. 1 illustrates an example system constructed in the accordance with the teachings of this disclosure and shown in an example environment of use 100. The example system of FIG. 1 generates NDVI data with respect to vegetation in the environment 100 (e.g., in an area of land). The system transfers the data to a controller substantially in real-time for the application of one or more agricultural treatment material(s) (e.g., fertilizers, pesticides) to the vegetation. The example of FIG. 1 includes a vehicle 102 capable of applying one or more treatment material(s). The example vehicle 102 is equipped with one or more apparatus to distribute the treatment material(s) (e.g., a sprayer boom). In some examples, the vehicle 102 is a land-based vehicle such as a tractor. In other examples, the vehicle 102 is an aerial vehicle, such as a crop duster. In the example of FIG. 1, the vehicle 102 applies a treatment material to an area 104 of the environment 100. The area 104 can be, for example, a crop field including vegetation 106 (e.g., crops or other plants), a portion of the crop field, or another area of land (e.g., a forest, etc.). In some examples, the area 104 is a portion of a larger area of land, such as a portion of a crop field containing the vegetation 106 to which the treatment material is to be applied. In some examples, areas of the land not containing the vegetation 106 to be chemically treated and/or containing one or more different type(s) of vegetation are not included in the area 104.

The example of FIG. 1 includes a dispersant controller 108. The dispersant controller 108 may be installed in the vehicle or remote from the vehicle 102. The dispersant controller 108 of this example controls distribution equipment of the vehicle 102 (e.g., a boom sprayer) to disperse one or more treatment material(s) (e.g., fertilizers, pesticides, etc.) on the vegetation 106. The example of FIG. 1 also includes a vehicle communicator 109 to receive data that is wirelessly transmitted to the vehicle communicator 109 via one or more protocols, such as WiFi, BLE, a wireless communication protocol such as LTE, and/or ultra-wide band radio technology. The vehicle communicator 109 may be installed in the vehicle 102 and/or installed in the dispersant controller 108. A user of the vehicle 102 may interact with the dispersant controller 108 and/or view data received by the vehicle communicator 109 via a graphical user interface (GUI) 111 displayed via a screen in the vehicle 102.

The example system of FIG. 1 includes a base station 110. The base station 110 serves as a landing, storage, and/or power charging area for one or more unmanned aerial vehicles (e.g., drones). As illustrated in FIG. 1, the example system of FIG. 1 also includes a first UAV 112, a second UAV 114, and a third UAV 116. In other examples, the system of FIG. 1 may include additional or fewer UAVs. In the example system, the UAVs 112, 114, 116 take off from the base station 110 and fly over the area 104 to collect image data. The UAVs 112, 114, 116 generate NDVI data and transmit the NDVI data to the vehicle communicator 109 of the vehicle 102 in substantially real-time. The UAVs 112, 114, 116 return to the base station 110 for power charging and/or storage as needed. In some examples, the base station 110 is located within or proximate to the area of interest 104 (e.g., within a flight distance of the area of interest 104 such that the UAVs can fly to the area, collect the image data, and return to the base station on a single charge of battery power). In other examples, the base station 110 is coupled to the vehicle 102 (e.g., a rear portion or a front portion of the vehicle 102) such that the UAV(s) 112 take off from and land on the vehicle 102. The base station 110 includes a power source 113 (e.g., a battery) for charging the UAVs 112, 114, 116.

In the example system of FIG. 1, a user of the vehicle 102 defines the area 104 or portion(s) thereof over which the UAV(s) 112, 114, 116 are to fly via one or more inputs to the dispersant controller 108 of the vehicle 102. For example, the user can input geographical coordinates of the area 104 via the GUI 111. In other examples, the area 104 is defined based on remotely entered user inputs and/or based on global positioning system (GPS) data collected via a GPS tracker of the vehicle 102. Data regarding the area 104 that is received by the controller 108 of the vehicle 102 is wirelessly transmitted to, for example, the first UAV 112 via the vehicle communicator 109 of the vehicle 102. In some examples, data regarding the area 104 is transferred to two or more of the UAVs 112, 114, 116 based on a size of the area 104 to be surveyed and the distance(s) that can be covered by the UAVs 112, 114, 116 before the UAVs 112, 114, 116 need to be recharged (e.g., multiple UAVs may be utilized to cover non-overlapping portions of the area 104).

In the example system of FIG. 1, each of the UAVs 112, 114, 116 includes a UAV communicator 118. For illustrative purposes, the UAV communicator 118 is shown in FIG. 1 with respect to the first UAV 112 with the understanding that the second and third UAVs 114, 116 also include a UAV communicator similar or identical to the UAV communicator 118. As an example, the UAV communicator 118 of the first UAV 112 receives the data regarding the area 104 over which the first UAV 112 is to fly from the vehicle communicator 109 via wireless transmission of the data between the communicators 109, 118, as represented by a wireless communication link 117 of FIG. 1.

Each of the UAVs 112, 114, 116 also includes a controller (e.g., a processor) 119 installed thereon. For illustrative purposes, the controller 119 is shown in FIG. 1 with respect to the first UAV 112 with the understanding that the example second and third UAVs 114, 116 also include a controller similar or identical to the controller 119. Continuing to refer to the first UAV 112 for ease of discussion, the example UAV communicator 118 of the first UAV 112 relays the data (e.g., GPS coordinates) identifying the area 104 to the controller 119. The example controller 119 on board the first UAV 112 controls the UAV 112 to take off from the base station 110 and fly over the area 104. In some examples, the controller 119 causes the first UAV 112 to fly over the area 104 at an identified height based on data received from the vehicle 102 with respect to, for example, a height of the vegetation 106 in the area 104 (e.g., the controller 119 instructs the first UAV 112 to use its sensors to maintain a vertical height of approximately 30 feet above the vegetation 106 while travelling over the varied terrain of the area 104).

In the example system of FIG. 1, each of the UAVs 112, 114, 116 includes one or more cameras 120 coupled thereto.

For illustrative purposes, the camera 120 is shown in FIG. 1 with respect to the first UAV 112 with the understanding that the second and third UAVs 114, 116 also include camera(s) similar or identical to the camera 120. As will be discussed below, the example camera 120 of FIG. 1 includes one or more color (e.g., RGB) sensors and one or more near-infrared sensors to capture light and generate image data (e.g., pixels). The example camera 120 of FIG. 1 can also measure depth via projection of a near-infrared light via one or more infrared laser projectors of the camera 120 (or any other sensor) to generate 3-D images. In the example of FIG. 1, the camera(s) 120 are implemented by RealSense™ cameras that are commercially available from Intel™ Corporation.

As the UAV(s) 112, 114, 116 fly over the area 104, the camera(s) 120 of the UAV(s) 112, 114, 116 generate image and/or sensor data by capturing one or more images of the area 104. In the example system, the camera(s) 120 generate image data in the X, Y, and Z planes. In some examples, the camera(s) 120 capture a plurality of images corresponding to field(s) of view of the camera(s) 120 based on a frame rate and/or frequency of the camera(s) 120. In some examples, the camera(s) 120 capture a plurality of images at different angles as the camera(s) 120 fly over the area 104. In the example system of FIG. 1, the UAV(s) 112, 114, 116 collect data within a time period occurring before the vehicle 102 passes through the area 104 to distribute treatment material(s). Any appropriate time frame may be used as the time period (e.g., less than 5 minutes, less than 1 minute).

In the example system of FIG. 1, the respective UAV controllers 119 of the UAVs 112, 114, 116 generate NDVI data based on the image data generated by the camera(s) 120 as the respective UAVs 112, 114, 116 fly over the area 104. For example, the UAV controller 119 of the first UAV 112 stores and processes the image data collected by the camera 120 of the first UAV 112 as the first UAV 112 flies over the area 104. The example UAV controller 119 of this example analyzes the collected camera image data on a pixel-by-pixel basis with respect to the reflection of light by the vegetation 106 in the area 104 (e.g., the reflection of visible and/or near-infrared light projected by the camera 120 or sunlight). The UAV controller 119 calculates spectral reflectance measurements based on the pixels in the image to generate NDVI data to create a 3-D NDVI point cloud of the area 104 surveyed by the UAV 112. In the example system of FIG. 1, the NDVI point cloud provides indications of, for example, an amount of the vegetation 106 in the surveyed area 104, a condition (e.g., health) of the vegetation 106, etc.

In some examples, the NDVI point cloud is constructed based on a plurality of images collected of the area 104 or a location within the area 104. The images may be collected by one or more cameras 120 of one or more UAVs. In some examples, image data (e.g., raw image data) is transmitted from the one or more UAVs collecting the data to another UAV for processing via, for example, wireless communication between the UAV communicators 118 of the respective UAVs, as represented by wireless communication link(s) 121 of FIG. 1. For example, the second UAV 114 and/or the third UAV 116 can transmit image data collected by their respective cameras 120 to the first UAV 112. In some such examples, the image data from the second UAV 114 and/or the third UAV 116 is processed by the UAV controller 119 of the first UAV 112 (e.g., in conjunction with the image data collected by the first UAV 112). In some such examples, the UAV controller 119 of the first UAV 112 averages or takes a median of the pixel data and/or the NDVI data generated from the image data collected by the first, second, and/or third UAVs 112, 114, 116 for overlaying portion(s) of the area 104 to generate the NDVI point cloud. In some examples, the UAV controller 119 of the first UAV 112 filters the image data and/or the NDVI data generated therefrom to remove outliers due to, for example, shadows in the area 104 that may not accurately reflect the presence of the vegetation 106. The UAV controller 119 of the first UAV 112 can apply one or more data processing techniques to analyze the image data and/or the NDVI data generated therefrom as part of creating the NDVI point cloud.

In other examples, the respective UAV controllers 119 of the UAVs 112, 114, 116 process the image data generated by their cameras 120 (e.g., by the camera(s) carried by the corresponding UAV 112, 114, 116). For example, the UAV controller 119 of the second UAV 114 can process the image data collected by the camera 120 of the second UAV 114 by filtering the data as discussed above in connection with the controller 119 of the first UAV 112. In some such examples, the second UAV 114 transmits the filtered image data to another UAV, such as the first UAV 112. In such examples, the UAV controller 119 of the first UAV 112 generates the NDVI point cloud based on the filtered image data received from the second UAV 114, the image data collected by the first UAV 112, and image data received from any other UAVs (which may or may not be filtered). In some examples, the UAVs (e.g., the second UAV 114) also transmits GPS data corresponding to the (raw or processed) image data to the first UAV 112 such that the image data is correlated to the GPS location(s).

In some other examples, the UAV controller 119 of, for instance, the second UAV 114 generates NDVI data (e.g., spectral reflectance measurements) based on the image data collected and processed by the second UAV 114. In some such examples, the second UAV 114 transmits the NDVI data to the first UAV 112. The controller 119 of the first UAV 112 generates an NDVI point cloud based on (1) the NDVI data received from the second UAV 114, (2) the NDVI data generated by the UAV controller 119 of the first UAV 112 based on image data collected by the first UAV 112, and (3) NDVI data received from any other UAVs.

In other examples, the UAV controller 119 of, for instance, the second UAV 114 generates an NDVI point cloud based on the NDVI data generated by the second UAV 114. In some such examples, the second UAV 114 transmits the point cloud data (e.g., 2-D or 3-D image data) to the UAV controller 119 of the first UAV 112. In such examples, the UAV controller 119 of the first UAV 112 fuses (e.g., merges or combines) the point cloud data from the various other UAVs 112, 114, 116 to generate an NDVI point cloud for the area 104. The point cloud data received from each UAV can correspond to different portions of the area 104, overlapping portion(s) of the area 104, and/or the same portions of the area 104 depending on the scope of flight coverage by the UAVs 112, 114, 116. In examples where the point cloud data corresponds to the same or overlapping portions of the area 104, the UAV controller 119 of the first UAV 112 can selectively use data from one of the UAVs or average or take a median of the point cloud data to generate the combined point cloud. Thus, the UAVs 112, 114, 116 of the example system of FIG. 1 work in concert to generate an NDVI point cloud for the area 104 and/or one or more portions of the area 104. For example, the UAVs 112, 114, 116 may form a mesh network to consolidate data and deliver the consolidated data to the vehicle 102 for use and/or further processing.

In the example system of FIG. 1, the vehicle 102 is within a range of the area of interest 104 or in the area of interest 104 at substantially the same time as the UAVs 112, 114, and/or 116 such that the vehicle communicator 109 can communicate with the UAV communicator(s) 118 of the UAV(s) 112, 114, 116. In the example system of FIG. 1, the NDVI point cloud is wirelessly transmitted from, for example, the UAV communicator 118 of the first UAV 112 (or any of the other UAVs) to the vehicle communicator 109 of the vehicle 102 in substantially real-time. For example, the first UAV(s) 112, 114, 116 can fly ahead of the tractor 102 relative to a direction of travel of the vehicle 102 in the area 104. Thus, the UAV(s) 112, 114, 116 collect image data for the area 104 to which the vehicle 102 has not yet applied treatment material(s) during a current application time period. As discussed above, in some examples, the UAV controllers 119 of the UAVs 112, 114, 116 create the NDVI point cloud as the UAV(s) 112, 114, 116 fly over the area 104 and the cameras 120 generate image data of the vegetation 106 in the area 104. One or more of the UAV communicators 118 of the UAV(s) 112, 114, 116 transmit the 3-D NDVI point cloud(s) to the vehicle communicator 109 of the vehicle 102 in substantially real-time. The vehicle communicator 109 delivers the NDVI point cloud(s) to the dispersant controller 108. In some such examples, the dispersant controller 108 of the vehicle 102 generates a point cloud for the area 104 based on the NDVI data and/or the point cloud(s) received from the UAV(s) by combining, consolidating, or fusing the data. In other examples, the dispersant controller 108 analyzes the point clouds received from the UAV(s) independent of one another (e.g., in examples where the NDVI data from each UAV corresponds to a different portion of the area 104). In some examples, the data collected by the UAVs is combined into one point cloud for delivery to the vehicle 102.

In some examples, the UAV communicators 118 of the UAV(s) 112, 114, 116 transmit the NDVI data (e.g., spectral reflection measurement data) to the vehicle communicator 109 of the vehicle 102 in substantially real-time. In such examples, the dispersant controller 108 of vehicle 102 generates the NDVI point cloud(s) based on the NDVI data received from the UAV(s) 112, 114, 116.

As discussed above, in some examples, each of the NDVI point clouds generated by the UAV(s) 112, 114, 116 are fused (e.g., merged, combined, etc.) by one of the UAV controllers, such as the UAV controller 119 of the first UAV 112. In other examples, the UAV controller 119 of one of the UAVs 112, 114, 116 generates the NDVI point cloud based on image data (e.g., raw image data, pre-processed image data) received from the other UAV(s) 112, 114, 116 and transmits the NDVI point cloud to the vehicle communicator 109 of the vehicle 102. Thus, in some examples, the vehicle 102 may receive data (e.g., point cloud(s)) from one UAV 112, 114, 116, which acts as a hub for collecting and processing the data.

In some examples, the dispersant controller 108 displays the NDVI point cloud(s) via the GUI 111 of the vehicle 102. In some examples, the dispersant controller 108 analyzes the NDVI point cloud(s) generated by the UAV(s) 112, 114, 116 and generates one or more instructions to be performed by the vehicle 102 with respect to spraying or otherwise applying the treatment material(s) to the vegetation 106 in the area 104. For example, the dispersant controller 108 can select a chemical to be applied to the vegetation 106 based on an analysis of a growth state of the vegetation 106 as represented by the NDVI point cloud(s). In some examples, the dispersant controller 108 determines an amount of the treatment material(s) to be applied to the vegetation 106 based on the analysis of the NDVI point cloud(s). In some examples, the dispersant controller 108 determines a height at which the treatment material(s) are to be applied based on the depth data provided by the NDVI point cloud(s) and/or a height at which the boomer sprayer is to be positioned during application of the treatment material(s) (e.g., as a result of the 3-D image generation of the camera(s) 120 of the UAV(s) 112, 114, 116). In some examples, the dispersant controller 108 identifies a particular location (e.g., geographical coordinates) within the area 104 that includes vegetation 106 to which the treatment material(s) are to be applied. In some such examples, the dispersant controller 108 communicates with a GPS tracker of the vehicle 102 to identify the location in the area 104 and/or provides directions for the vehicle 102 to reach the location.

Thus, the example system of FIG. 1 provides enhanced NDVI data in the form of 3-D NDVI point cloud(s) generated by one or more UAVs and transmitted in substantially real-time to the vehicle 102. As a result, the vehicle 102 receives substantially current information about the vegetation 106 in the area 104. The NDVI point cloud(s) can be used to more accurately identify locations within the area 104 that include vegetation 106 to receive the treatment material(s) as compared to historical NDVI data. The 3-D point cloud(s) enable increased precision in applying the treatment material(s) with respect to, for example, a height of the vegetation 106 as compared to 2-D images. Thus, the example system of FIG. 1 enables efficient, cost-effective, and environmentally friendly distribution of agricultural treatment material(s) to vegetation. Also, the incorporation of the cameras 120 on the UAVs 112, 114, 116 provide for lightweight and/or non-obstructive apparatus by which to generate NDVI data as compared to known cameras or other sensors.

After the UAV(s) 112, 114, 116 survey the area 104, the UAV(s) 112, 114, 116 returns to the base station 110. In some examples, the camera(s) 120 of the UAV(s) 112, 114, 116 generate image data as the UAV(s) fly back to the base station 110, including depth data with respect to a height of the UAV(s) 112, 114, 116. The UAV controller(s) 119 of the respective UAV(s) use the image data to determine respective landing location(s) for the UAV(s) 112, 114, 116 (e.g., identifying a location of the base station 110 from the image data, identifying a height of the base station 110 from the image data, etc.). Thus, the 3-D images generated by the camera(s) 120 can be used by the UAV controller(s) 119 to increase precision in the respective landing location(s) of the UAV(s) 112, 114, 116.

Figure 2:
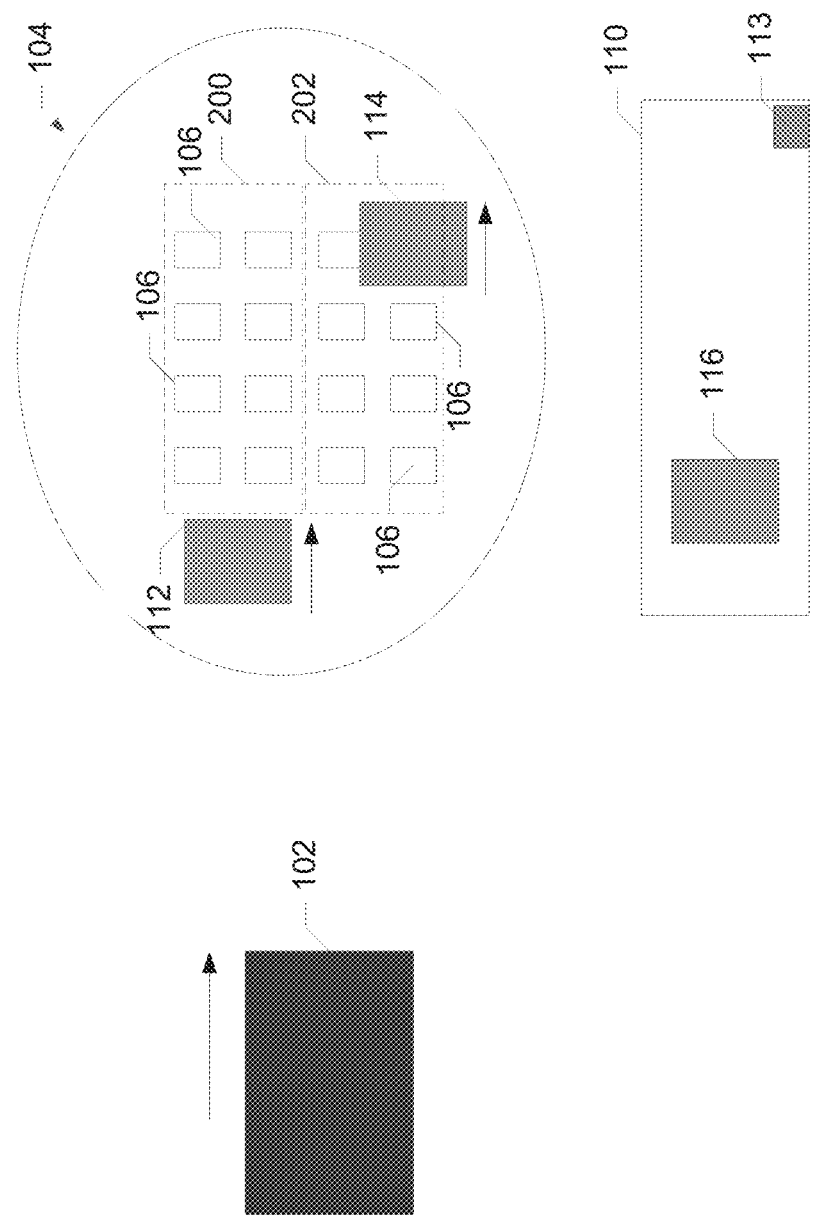
FIG. 2 is an aerial view of the example system of FIG. 1.

FIG. 2 is an aerial view of the example system in the example environment 100 of FIG. 1. As illustrated in FIG. 2, the vehicle 102 is to travel to area 104 to, for example, apply one or more treatment material(s) to the vegetation 106 in the area 104. As illustrated in FIG. 2, one or more UAVs (e.g., UAVs 112, 114) can be deployed to survey the area 104 to generate the NDVI point cloud(s) for the area 104 to be sprayed by the vehicle 102. For example, based on a size of the area 104 and the speed at which the data is needed, the first UAV 112 can fly over a first portion 200 of the area 104 and the second UAV 114 can fly over a second portion 202 of the area 104 (e.g., as represented by arrows in FIG. 2) to map or survey the respective first and second portions 200, 202. As discussed above, in some examples, the UAV controllers 119 of the first and second UAVs 112, 114 respectively communicate with the vehicle communicator 109 of the vehicle 102 to transmit the NDVI point clouds for the first and second portions 200, 202 of the area 104 to the vehicle 102. In other examples, the first and second UAVs 112, 114 communicate the NDVI data between one another (e.g., via the respective UAV communicators 118) to compile image data and/or NDVI data, and then transmit the compiled image data to the vehicle 102. For example, the first UAV 112 can transmit the image data and/or the NDVI data for the first portion 200 of the area 104 to the second UAV 114, and the second UAV 114 can generate an NDVI point cloud based on the data for the first and second portions 200, 202. In other examples, the first UAV 112 transmits a first NDVI point cloud for the first portion 200 to the second UAV 114, and the second UAV 114 combines the first NDVI point cloud for the first portion 200 with a second NDVI point cloud for the second portion 202. In the example of FIG. 2, the first UAV 112 and the second UAV 114 fly at substantially the same height relative to the ground, which facilitates combining the data. In some examples, a height of one of the first UAV 112 or the second UAV 114 may be higher than the other based on a difference in elevation (e.g., a rolling field). In some examples, the vertical distance between each UAV and the vegetation it is imaging is the same for all UAVs during data collection (although if the field is not level or the vegetation is growing at different heights, the UAVs may be at different altitudes).

In some examples, the UAVs 112, 114, 116 fly according to a predetermined flight pattern or sequence based on for example, a size of the area 104 to be surveyed and a duration of time for which each UAV 112, 114, 116 can fly before running out of power. For instance, in the example illustrated in FIG. 2, the third UAV 116 is at the base station 110 charging (e.g., via the power source 113) while the first and second UAVs 112, 114 are flying. The third UAV 116 can be deployed for example, when the first UAV 112 returns to the base station 110 for charging to provide substantially continuous mapping and NDVI data generation. Alternatively, the UAVs 112, 114 may fly simultaneously and independently return to the base station 110 when a battery level of the corresponding UAV 112, 114 is low.

Figure 3:
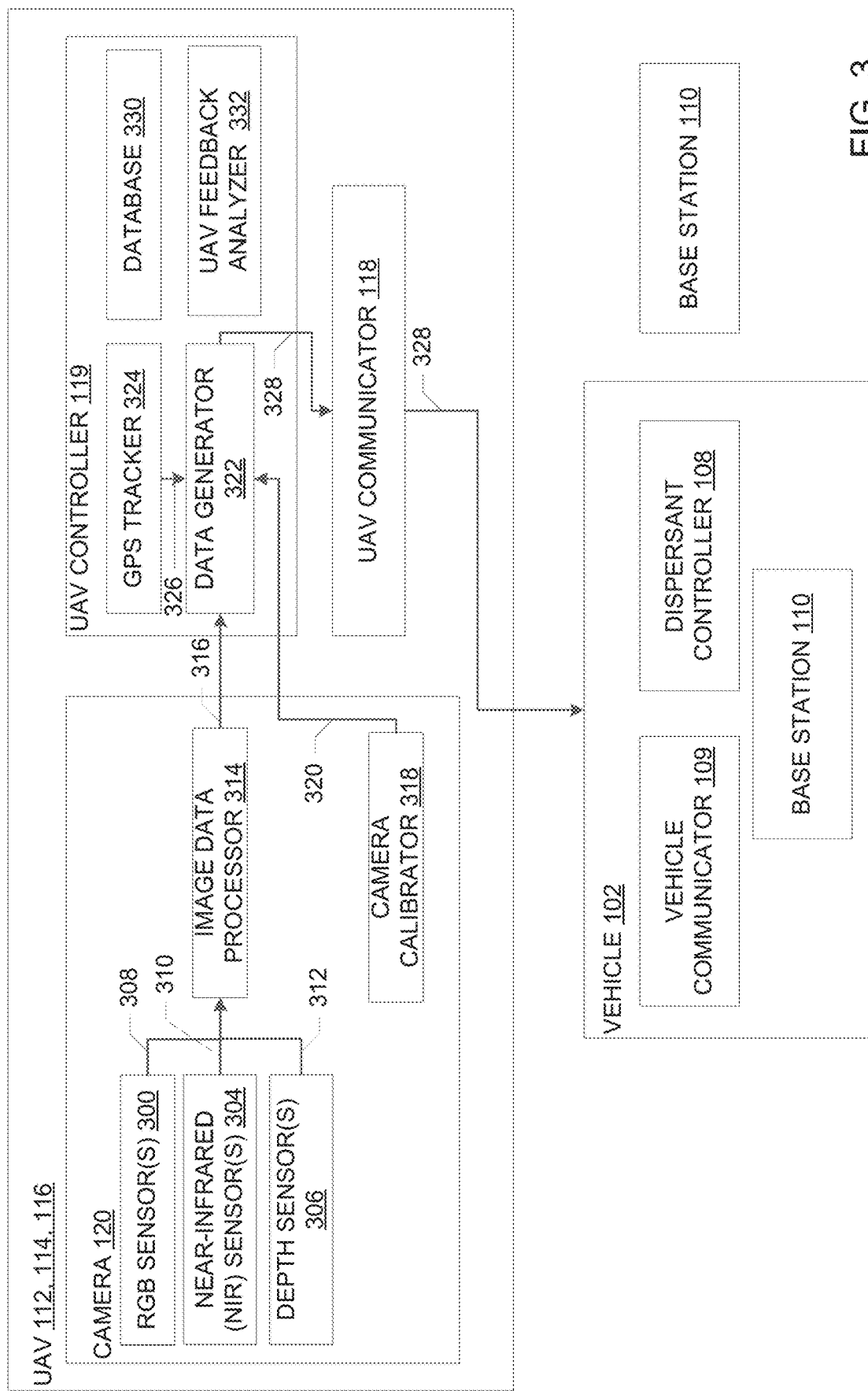
FIG. 3 is a block diagram of an example implementation of the example system of FIGS. 1 and 2.

FIG. 3 is a block diagram of an example implementation of the system of FIGS. 1 and 2. As disclosed above in connection with FIGS. 1 and 2, the example environment 100 can include one or more UAVs 112, 114, 116. Each of the example UAV(s) 112, 114, 116 includes a camera 120. In the example illustrated in FIG. 3, the example cameras 120 of each of the UAV(s) 112, 114, 116 include at least one red-green-blue (RGB) sensor 300, at least one near-infrared (NIR) sensor 304, and at least one depth sensor 306. In other examples, some or all of the UAVs may be equipped with one or more different camera(s). The RGB sensor(s) 300 of this example detect red, green, and/or blue wavelengths of light to generate RGB image data 308 as the UAV(s) 112, 114, 116 fly over the area 104. The NIR (near-infrared) sensor(s) 304 detect near-infrared wavelengths of light to generate NIR image data 310 for the area 104. The depth sensor(s) 304 measure a distance of the camera 120 from a target, such as the ground of the area 104 or the vegetation 106 in the area 104 to generate depth data 312 for the area 104. In the example of FIG. 3, the RGB image data 308, the NIR image data 310, and the depth data 312 is processed by an image data processor 314 on board the camera of the corresponding UAV.

The example image data processor 314 of FIG. 3 performs one or more data processing techniques on the RGB image data 308, the NIR image data 310, and/or the depth data 312. For example the image data processor performs vignetting correction on the RGB image data 308 and the NIR image data 310 to reduce brightness and/or saturation errors in the images. The image data processor 314 correlates the RGB image data 308, the NIR image data 310, and the depth data 312 to create aligned image data 316. The image data processor 314 correlates image data collected in the X-Y plane with the depth data collected in the Z plane. The image data processor 314 outputs the aligned image data 316 including 3-D coordinate data and corresponding spectral channel values, namely, red, green, blue, and NIR values for the coordinates. In some examples, the aligned image data 316 is in the form of a tuple.

In some examples, the camera(s) 120 of the UAV(s) 112, 114, 116 each include a camera calibrator 318 as shown in FIG. 3. The camera calibrator 318 calibrates the RGB sensor(s) 300 and the NIR sensor(s) 304 of the corresponding camera 120 to determine a response of each sensor 300, 304 to spectral energy levels as a result of the reflection of light (e.g., sunlight) by the vegetation 106. This calibration process normalizes the data to smooth out any differences that might be present in the sensor(s) use to collect the data due to manufacturing tolerance, age, etc. In some examples, the camera calibrator 318 uses previously collected image data (e.g., RGB image data, NIR image data) for the calibration. The camera calibrator 318 generates a configuration file 320 that contains a configuration state space such that a pixel of the RGB image data 308 and/or a pixel of the NIR image data 310 can be correlated to a spectral energy level measurement. The calibration of the RGB sensor(s) 300 and the NIR sensor(s) 304 normalizes data collected by the RGB sensor(s) 300 and the NIR sensor(s) 304 and, thus, enables combining of the respective RGB image data 308 and the NIR image data 310. As will be discussed below in further detail, the spectral energy levels can be used to generate a vegetation index for one or more data points corresponding to geographical locations in the area 104.

The example camera calibrator 318 of FIG. 3 employs one or more equations to generate the configuration file 320 to relate responses of the RGB sensor(s) 300 to spectral energy levels to responses of the NIR sensor(s) 304 to those same spectral energy levels. For example, the example camera calibrator 318 of FIG. 3 can employ the following equations to analyze the responses of the RGB sensor(s) 300 and the NIR sensor(s) 304 and generate the configuration file 320 containing the configuration state spaces.

Where n=the RGB sensor 300, the NIR sensor 304, or a channel of the respective sensors 300, 304; $s_n(\lambda)$=spectral function of the sensor n; $e(\lambda)$=spectral function of an emitter (e.g., the sun or a light emitted by the camera 120); $r(\lambda)$= spectral function of a reflector (e.g., a plant or crop of the vegetation 106); $c_e$=emitter related scaling factor; $c_r$=reflector related scaling factor; $c_s$=sensor related scaling factor; $c_{config,\,n}$=scaling factor for configuration of a sensor (e.g., the RGB sensor 300, the NIR sensor 304) or channel of the respective sensors 300, 304; M=measured energy by the sensor (e.g., RGB sensor 300, the NIR sensor 304); and E=external measured energy; when, $$E_{config,n} = c_e c_r c_s \int_{\lambda_{min,n}}^{\lambda_{max,n}} e(\lambda) r(\lambda) s_n(\lambda) d\lambda \quad \text{(Eq. 1); and}$$

$$M_{config,n} = c_{config,n} c_e c_r c_s \int_{\lambda_{min,n}}^{\lambda_{max,n}} e(\lambda) r(\lambda) s_n(\lambda) d\lambda \text{(Eq. 2)(Eq. 2); then}$$

$$M_{config,n} = c_{config,n} E_{s,n} \quad \text{(Eq. 3), where for}$$

$c_{config,\,rgb}$: $M_{config,blue}$=blue value of RGB sensor 300, $M_{config,green}$=green value of RGB sensor 300, $M_{config,red}$=red value of RGB sensor 300; and where for $c_{config,\,nir}$: $M_{config,nir}$=infrared value of NIR sensor 304.

To determine a correlation between the RGB sensor 300 and the NIR sensor 304, the example camera calibrator 318 finds all (Eq. 4):

$$a_{1\to 2} = \frac{E_{n_1}}{E_{n_2}},$$

where $\alpha_{1\to 2}$ refers to a configuration of each of the RGB sensor 300 and the NIR sensor 304. To find the correlation between the RGB sensor 300 and the NIR sensor 304, the following equations can be employed by the camera calibrator 318:

$$\text{where } a_{1\to 2} = \frac{E_{n_1}}{E_{n_2}}; \quad \text{(Eq. 5)}$$

then $$a_{1\to 2} = \frac{M_{config,n_1} c^{-1}_{config,n_1}}{M_{config,n_2} c^{-1}_{config,n_2}}. \quad \text{(Eq. 6)}$$

In some examples, the camera configurations include constraints with settings or parameters of the camera 120 such as over-exposure or under-exposure of the images obtained by the camera 120 and/or other parameters such as gain. The camera calibrator 318 defines a configuration state space based on the analysis of Equation 1. For example, for the camera 120 containing the RGB sensor 300 and the NIR sensor 304 and a configuration of the camera 120 including p parameters, a configuration state space of the camera 120 can be defined as $\mathbb{R}^{2+2p}$.

As illustrated in FIG. 3, the example image data processor 314 transmits the aligned image data 316 to a data generator 322 of the UAV controller 119. Also, the camera calibrator 318 transmits the configuration file 320 to the data generator 322. The example data generator 322 processes the aligned image data 316 to generate a vegetation index for each data point in the aligned image data 316. Thus, in some examples, the data generator 322 is an NDVI data generator. For example, the data generator 322 performs spectral leveling on the aligned image data 316 to scale or translate the pixel values of the aligned image data 316 (e.g., a tuple) to spectral measurements or energy levels measured by the RGB sensor(s) 300 and the NIR sensor(s) 304 as a result of the reflection of light (e.g., sunlight) by the vegetation 106. The example data generator 322 of FIG. 3 uses the configuration file 320 to correlate the pixel values of the RGB image data 308 and the NIR image data 310 with respect to spectral measurements.

The example data generator 322 of FIG. 3 calculates a vegetation index for each pixel in the aligned image data 316. For example, the data generator 322 computes the vegetation index NDVI for a pixel based on the following equation:

$$NDVI=(NIR-VIS)/(NIR+VIS),$$

where VIS is a spectral measurement collected by the RGB sensor 300 and NIR is a spectral measurement collected by the NIR sensor 304 (e.g., as determined based on the configuration file 320).

As disclosed above, in some examples, one or more of the first, second, and/or third UAVs 112, 114, 116 receives image data from one or more of the other UAVs (e.g., UAV112, 114, 116). For example, the first UAV 112 can receive image data from the second UAV 114 and/or the third UAV 116 (e.g., RGB image data, NIR image data, and/or depth data). The data received from the UAV(s) 114, 116 can include raw image data or pre-processed image data (e.g., data that has undergone vignetting correction at the second or third UAV 114, 116 before being transmitted to the first UAV 112). In such examples, the image data processor 314 and/or the data generator 322 of the first UAV 112 may perform one or more data processing operations on the image data received from the second UAV 114 and/or third UAV 116 with respect to the data 308, 310, 312. For example, the data generator 322 of the first UAV 112 can translate the pixel values of the image data received from the second and/or third UAVs 114, 116 to spectral measurements or energy levels to determine the vegetation indices corresponding to the portions of the area 104 captured by the second and/or third UAVs 114, 116. Thus, in some examples, the one of the UAVs 112, 114, 116 compiles data from the other UAVs and processes the compiled data to determine the vegetation indices.

Based on the vegetation indices calculated for the pixel values of the aligned image data 316, the data generator 322 (e.g., an NDVI data generator 322) generates an NDVI point cloud, map, or model of the area 104 with respect to the amount and/or condition of the vegetation 106 in the area 104. The example UAV controller 119 of FIG. 3 includes a GPS tracker 324 that tracks a location of the UAV(s) 112, 114, 116 as the UAV(s) 112, 114, 116 fly over the area 104 to generate GPS data 326. The NDVI data generator 322 correlates the vegetation indices based on the pixel image data of the camera(s) 120 and the GPS data 326 to create an NDVI or vegetation landscape model 328 that visually depicts the vegetation indices for the vegetation 106 of the area 104. In some examples, the NDVI model is a point cloud or a 3-D model based on the generation of the depth data 312 by the camera(s) 120. In other examples, the data generator 322 generates a 2-D map. The NDVI model 328 can be stored in a database 330 of the UAV controller 119.

As discussed above, in some instances, the data generator 322 of, for example, the first UAV 112 generates the NDVI point cloud based on vegetation indices and GPS data received from the second UAV 114 and/or the third UAV 116. In other examples, the data generator 322 of the first UAV 112 receives NDVI models (e.g., 3-D point cloud image data) from the second UAV 114 and/or the third UAV 116 and combines the NDVI model(s) to generate an NDVI model for the area 104 and/or one or more portions thereof.

The example data generator 322 of FIG. 3 transmits the NDVI model 328 to the UAV communicator 118. The example UAV communicator 118 wirelessly transmits the NDVI model 328 to the vehicle communicator 109 of the vehicle 102 (e.g., via WiFi, Bluetooth®, etc.). As disclosed above, the vehicle communicator 109 transmits the NDVI model 328 to the dispersant controller 108 of the vehicle 102 for display (e.g., via the GUI 111 of the vehicle 102) and/or analysis for controlling distribution of treatment material(s) via the vehicle 102. In some examples, the UAV communicator 118 transmits the NDVI model 328 of a given UAV when the UAV 112, 114, 116 is docked at the base station 110. As illustrated in FIG. 3, the base station 110 can be located at the vehicle 102 and/or a location separate from the vehicle 102.

In some examples, the image data 308, 310, the depth data 312, and/or the GPS data 326 are used by the UAV controller 119 to determine a landing location of the UAV(s) 112, 114, 116 with respect to the base station 110 (FIG. 1). For example, a landing position for the UAV 112, 114, 116 at the base station 110 can be stored in the database 330. A 3-D image generated by the camera 120 can be correlated with the GPS data 326 as the UAV 112, 114, 116 returns to the base station 110 to more accurately identify a location of the UAV 112, 114, 116 relative to the landing position at the base station 110.

In some examples, the UAV controller 119 includes a UAV feedback analyzer 332 to detect patterns with respect to processing of the image data 308, 310, 316, the depth data 312, and/or the GPS data 326. The UAV feedback analyzer 332 can use one or more deep learning techniques to optimize processing of the data, the generation of the NDVI model 328, and/or the determination of the landing position of the UAV 112, 114, 116 with respect to the base station 110. The vehicle 102 may not be part of the system. Instead, the vehicle communicator 109, the dispersant controller 108, and the base station 110 may be part of the system and sold for integration into the vehicle (e.g., as an after-market add-on).

While an example manner of implementing the example system of FIGS. 1-2 is illustrated in FIG. 3, one or more of the elements, processes and/or devices illustrated in FIG. 3 may be combined, divided, re-arranged, omitted, eliminated and/or implemented in any other way. Further, the example dispersant controller 108, the example vehicle communicator 109, the example UAV(s) 112, 114, 116, the example UAV communicator(s) 118, the example UAV controller(s) 119, the example camera(s) 120, the example RGB sensor(s) 300, the example NIR sensor(s) 304, the example depth sensor(s) 306, the example image data processor 314, the example camera calibrator 318, the example data generator 322, the example GPS tracker 324, the example database 330, the example UAV feedback analyzer 330 and/or more generally, the example system of FIGS. 1-3 may be implemented by hardware, software, firmware and/or any combination of hardware, software and/or firmware. Thus, for example, any of the example dispersant controller 108, the example vehicle communicator 109, the example UAV(s) 112, 114, 116, the example, UAV communicator(s) 118, the example UAV controller(s) 119, the example camera(s) 120, the example RGB sensor(s) 300, the example NIR sensor(s) 304, the example depth sensor(s) 306, the example image data processor 314, the example camera calibrator 318, the example data generator 322, the example GPS tracker 324, the example UAV feedback analyzer 332 and/or, more generally, the example system of FIGS. 1-3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dispersant controller 108, the example vehicle communicator 109, the example UAV(s) 112, 114, 116, the example, UAV communicator(s) 118, the example UAV controller(s) 119, the example camera(s) 120, the example RGB sensor(s) 300, the example NIR sensor(s) 304, the example depth sensor(s) 306, the example image data processor 314, the example camera calibrator 318, the example data generator 322, the example GPS tracker 324, and/or the example UAV feedback analyzer 332 is/are hereby expressly defined to include a non-transitory computer readable storage device or storage disk such as a memory, a digital versatile disk (DVD), a compact disk (CD), a Blu-ray disk, etc. storing the software and/or firmware. Further still, the example system of FIGS. 1-3 may include one or more elements, processes and/or devices in addition to, or instead of, those illustrated in FIGS. 1-3, and/or may include more than one of any or all of the illustrated elements, processes and devices.

Figure 4:
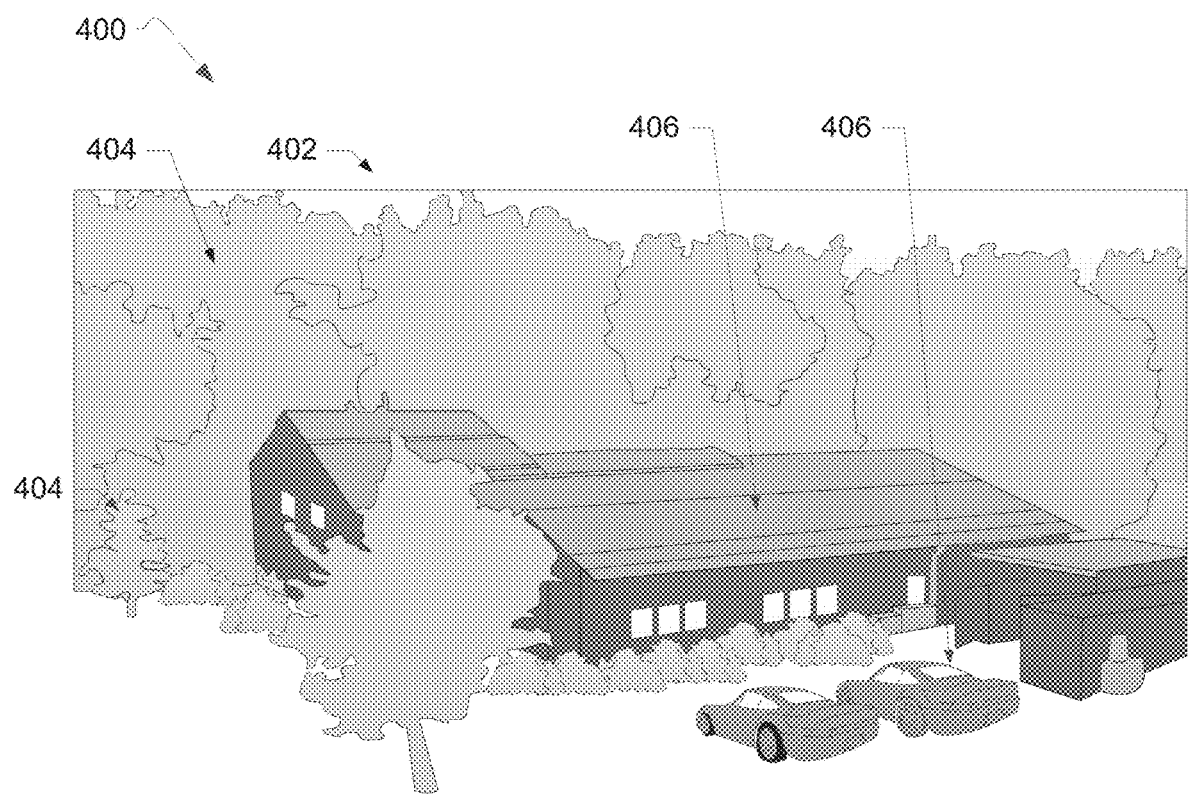
FIG. 4 is an illustration of an example NDVI model generated by the system of FIGS. 1-3.

FIG. 4 is an example illustration of an NDVI model 400 generated by the example data generator 322 of FIG. 3. As illustrated in FIG. 4, the example NDVI model 400 is a 3-D representation of an area 402. The NDVI model 400 includes one or more portions 404 shaded to indicate a presence of vegetation in the area 402 based on the spectral measurements obtained from the image data (e.g., the RGB image data 308, the NIR image data 310). The NDVI model 400 includes one or more portions 406 shaded to indicate an absence or low presence of vegetation in the area 402 (e.g., corresponding buildings in the area 402) based on a degree of light reflection or absorption in the portions 406.

Flowcharts representative of example machine readable instructions for implementing the example system of FIGS. 1-3 are shown in FIGS. 5-8. In these examples, the machine readable instructions comprise a program for execution by a processor such as the UAV controller 119 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the UAV controller 119, but the entire program and/or parts thereof could alternatively be executed by a device other than the UAV controller 119 and/or embodied in firmware or dedicated hardware. Further, although the example program is described with reference to the flowcharts illustrated in FIGS. 5-8, many other methods of implementing the example system may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-8 may be implemented using coded instructions (e.g., computer and/or machine readable instructions) stored on a non-transitory computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 5:
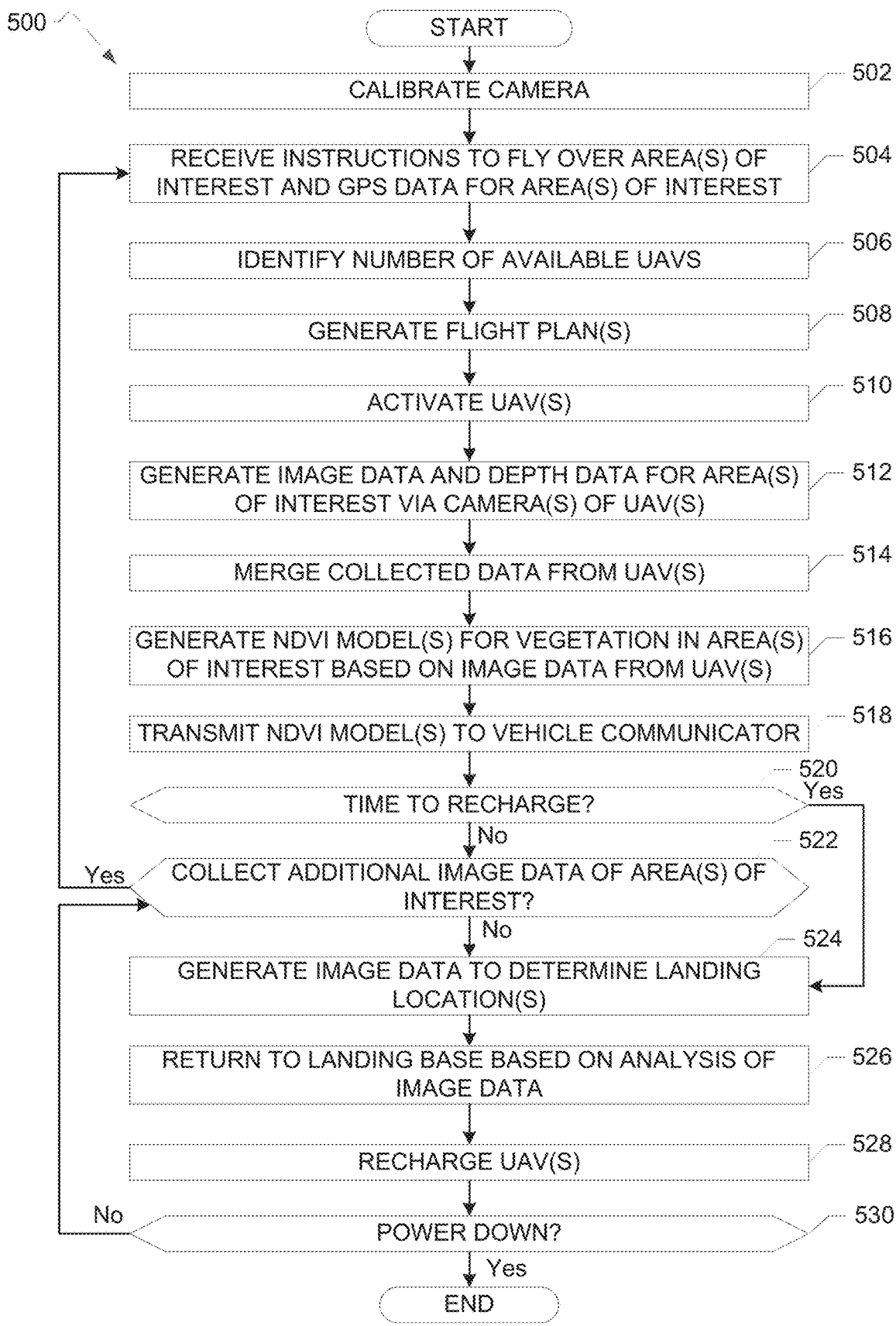
FIG. 5 is a flowchart representative of example machine readable instructions that may be executed to implement the example system of FIGS. 1-3.

FIG. 5 is a flowchart representative of example machine readable instructions 500 that, when executed, cause the example system of FIGS. 1-3 to generate one or more NDVI or vegetation landscape model(s) (e.g., the NDVI model(s) 328 of FIG. 3, which can include one or more point clouds). The example instructions of FIG. 5 can be executed in whole or in part by one or more of the dispersant controller 108 (e.g., of the vehicle 102), the image data processor 314 of the camera(s) 120 of any or all of the respective first, second, or third UAVs 112, 114, 116, and/or the UAV controller 119 of any or all of the respective first, second, or third UAVs 112, 114, 116 of FIGS. 1-3. In some examples, multiple instances of the instructions of FIG. 5 are executed in parallel by the same or different component(s) of the system.

In the example of FIG. 5, the camera calibrator 318 of the UAV 112, 114, 116 calibrates the camera 120 with respect to the RGB sensor(s) 300 and the NIR sensor(s) 304 (block 502). For example, the camera calibrator 318 applies one or more equations (e.g., Equations 1-6) to known image data generated by the RGB sensor(s) 300 and/or the NIR sensor(s) 304 to normalize the response of the RGB sensor(s) 300 and the NIR sensor(s) 304 with respect to spectral energy levels indicative of reflections of light emitted by an emitter (e.g., the sun) and reflected by a reflector (e.g., vegetation). The camera calibrator 318 generates the camera configuration file 320 that can be used to correlate the pixel data collected by the RGB sensor(s) 300 and the NIR sensor(s) 304 with spectral energy levels.

In the example of FIG. 5, the dispersant controller 108 of the vehicle 102 receives instructions for the UAV(s) to fly over one or more areas of interest (block 504). The instructions can include GPS coordinates for the area(s) of interest. In some examples, the instructions are received via one or more user inputs entered at the dispersant controller 108 via the GUI 111 of the vehicle 102. In other examples, the instruction(s) are sent to the UAV communicator 118 of the corresponding UAV(s) 112, 114, 116 by, for example, the vehicle communicator 109 of the vehicle 102. In such examples, the UAV communicator 118 relays the instruction(s) to the UAV controller 119 on board the respective UAV 112, 114, and/or 116.

Based on the instructions, the dispersant controller 108 and/or the UAV controller 119 of the UAV(s) identify a number of available UAVs (block 506). The UAVs 112, 114, 116 can be identified as available based on, for example, power level(s) (e.g., battery charge status) of the UAV(s), duration(s) of time that the UAV(s) have been docketed at the base station 110, duration(s) of preceding flight(s) of the UAV(s), maintenance statuses of the UAV(s), etc. In some examples, the dispersant controller 108 and/or the UAV controller 119 identify the available UAV(s) based on a determination that a particular UAV has sufficient power to fly to and over at least some of the area(s) of interest, capture image data, and return to the base station 110.

In the example of FIG. 5, the dispersant controller 108 and/or the UAV controller 119 generate flight plan(s) for the available UAV(s) 112, 114, 116 (block 508). For example, based on the GPS data for the area(s) to be surveyed and the power charge status of the available UAV(s), the dispersant controller 108 and/or the UAV controller 119 generate flight plan(s) including the GPS coordinates of the area(s) of interest and/or portion(s) thereof to be covered by corresponding one(s) of the UAVs. For example, the dispersant controller 108 and/or the UAV controller 119 can determine that the first UAV 112 will survey the first portion 200 of the area 104 of FIG. 2 and the second UAV 114 will survey the second portion 202 of the area 104.

In the example of FIG. 5, the UAV controller 119 of the corresponding UAV(s) 112, 114, 116 that have been identified as available UAV(s) activates the corresponding UAV (block 510). In some examples, the UAV controller 119 activates the corresponding UAV 112, 114, 116 based on instructions received from the vehicle communicator 109 of the vehicle 102 and/or a UAV communicator 118 of another UAV. In some examples, activation of the UAV(s) 112, 114, 116 includes delivering the flight plan(s) to the corresponding UAV(s).

The activated UAV(s) 112, 114, 116 take off from, for example, the base station 110 and fly over the area(s) 104 according to the flight plan(s). The GPS tracker(s) 324 of the activated UAV(s) track location(s) of the UAV(s) during flight relative to the GPS data for the area(s). The UAV(s) 112, 114, 116 generate image data and depth data of the area(s) 104 via their respective camera(s) 120 during flight (block 512). The image data can include pixel data generated by the sensor(s) 300, 304 of the camera(s) 120. The depth data includes measurements in the Z plane, such as a height of the camera(s) 120 of the UAV 112, 114, 116 relative to vegetation in the area(s) 104. The camera(s) 120 can be activated to generate image and/or depth data by the image data processor 314 of the camera(s) 120.

In some examples in which two or more UAVs are activated, the UAV controller 119 of one of the UAV(s) 112, 114, 116 merges (e.g., combines) the image data 308, 310 and the depth data 312 generated by the UAV(s) for the area(s) of interest (block 514). The data can be transmitted between the UAV communicators 118 of two or more UAV(s) via the wireless communication link(s) 121. In some examples, the UAV controller 119 of, for example, the first UAV 112 receives raw image data 308, 310 and raw depth data from one or more other UAV(s) 114, 116. In such examples, the UAV controller 119 of the first UAV 112 processes the data from the UAV(s) by filtering the data, correlating the image and/or depth data based on GPS data, etc. In some examples, the UAV controller 119 of, for example, the first UAV 112 receives pre-processed data (e.g., filtered data) from the other UAV(s) 114, 112. In such examples, the UAV controller 119 merges the pre-processed data with data collected and processed by the first UAV 112. In other examples, the UAV controller 119 of, for example, the first UAV 112 receives spectral measurement data generated by each UAV for the vegetation 106 based on the image data for the area(s) 104.

In other examples, the dispersant controller 108 of the vehicle 102 merges the data received from the UAV(s) 112, 114, 116 based on communication between the UAV communicator(s) 118 and the vehicle communicator 109 of the vehicle 102 (block 514). The raw and/or processed data (e.g., image data, spectral measurement data, etc.) can be transmitted between the UAV communicator(s) 118 of the UAV(s) and the vehicle communicator 109 via the wireless communication link(s) 117.

The location of block 514 merging the data generated by two or more UAVs in FIG. 5 can be different for different examples. In fact, the merging of data can occur at one or more different times in the example flow chart of FIG. 5, as discussed above.

In the example of FIG. 5, the UAV controller(s) 119 of the UAV(s) 112, 114, 116 generate the NDVI model(s) 328 (e.g., point cloud(s)) of the vegetation 106 in the area of interest 104 based on the image data from the UAV(s) (block 516). For example, the image data processor(s) 314 of the camera(s) 120 process (e.g., filter) the image data. The UAV controller(s) 119 analyze pixel values in the image data with respect to the reflection of light by the vegetation 106 in the area 104 (e.g., the reflection of visible and/or near-infrared light projected by the camera 120 or sunlight). The UAV controller(s) 119 calculate spectral reflectance measurements based on the pixels in the image data to generate NDVI data, or vegetation indices for the vegetation 106 in the area(s) of interest. The UAV controller(s) 119 generate NDVI or vegetation landscape model(s) 328 (e.g., 3-D point clouds) that visually depict the vegetation indices for the vegetation 106 of the area(s) 104 surveyed by the UAV(s) 112, 114, 116. In some examples, the UAV controller 119 of one of the UAV(s) 112, 114, 116 generates the NDVI model(s) based on data received from the other UAV(s). In some examples, the dispersant controller 108 of the vehicle 102 generates the NDVI model(s) based on the data received from the UAV(s).

In examples of FIG. 5 where the NDVI model(s) are generated by the UAV(s), the UAV communicator(s) 118 transmit the corresponding NDVI model(s) to the vehicle communicator 109 of the vehicle 102 (block 518). In some examples, the vehicle 102 is in the area of interest at substantially the same time as the UAV(s) 112, 114, 116 or at a distance from the area of interest at which the vehicle 102 and the UAV(s) 112, 114, 116 can communicate via wireless communication link(s) 117. For example, the UAV communicator(s) 118 transmit the NDVI model(s) to the vehicle communicator 109 in substantially real-time. In some examples, the vehicle communicator 109 transmits the NDVI model(s) to the dispersant controller 108 of the vehicle 102 for display and/or analysis with respect to a selection, location, and/or quantity of treatment material(s) to be applied to the vegetation 106 in the area 104. Thus, the dispersant controller 108 of the vehicle 102 receives data regarding the amount and/or condition (e.g., growth state) of the vegetation 106 in substantially real-time and can generate one or more instructions for application of the treatment material(s) based on current data. Further, in examples where the NDVI model(s) are 3-D model(s), the dispersant controller 108 can more accurately determine a location and/or height at which the treatment material(s) are to be applied to the vegetation 106.

The UAV controller(s) 119 of the corresponding UAV(s) 112, 114, 116 determine whether the UAV should be recharged (block 520). The decision as to whether the UAV 112, 114, 116 should be recharged can be based on, for example, a power level of the UAV, whether the treatment is finished, a power state of the vehicle 102, etc.

If the UAV(s) 112, 114, 116 do not need to be recharged, the corresponding UAV controller(s) 119 determine that whether or not to collect additional image data of the area(s) 104 via the camera(s) 120 of the UAV(s) 112, 114, 116 (block 522). If the UAV(s) 112, 114, 116 have not yet flown over all or substantially all of the area(s) 104 and collected image data of the defined area(s) 104 (e.g., based on the flight plan(s)), then control returns to block 504 to receive additional instructions to cause the UAV(s) to fly over the same or new area(s) of interest.

If a determination is made that one or more of the UAV(s) 112, 114, 116 should be recharged, or if a determination is made that no additional image data is needed for the area(s) of interest, then the camera(s) 120 of the corresponding UAV(s) 112, 114, 116 generate image data to determine a landing location of the corresponding UAV(s) 112, 114, 116 with respect to the base station 110 (block 524). For example, the UAV controller(s) 119 of the UAV(s) 112, 114, 116 can identify a location of the base station 110 from the image data, identify a height of the base station 110 from the image data, etc.

In the example of FIG. 5, the UAV(s) 112, 114, 116 return to the base station 110 based on the analysis of the image data (block 526). Thus, the 3-D images generated by the camera(s) 120 can be used by the UAV controller(s) 119 to increase precision in the respective landing location(s) of the UAV(s) 112, 114, 116.

In the example of FIG. 5, the UAV(s) 112, 114, 116 are recharged at the base station 110 (block 528). Subsequently, the UAV controller 119 determines whether the UAV(s) 112, 114, 116 should be powered down (e.g., the vehicle is powered off which may indicate no additional image collection is desired in the immediate future) (block 530). If the UAV(s) 112, 114, 116 are not to be powered down, then control returns to block 522 to receive instructions for additional flyovers. If the UAV(s) 112, 114, 116 are to be powered down, then the example of FIG. 5 ends.

Figure 6:
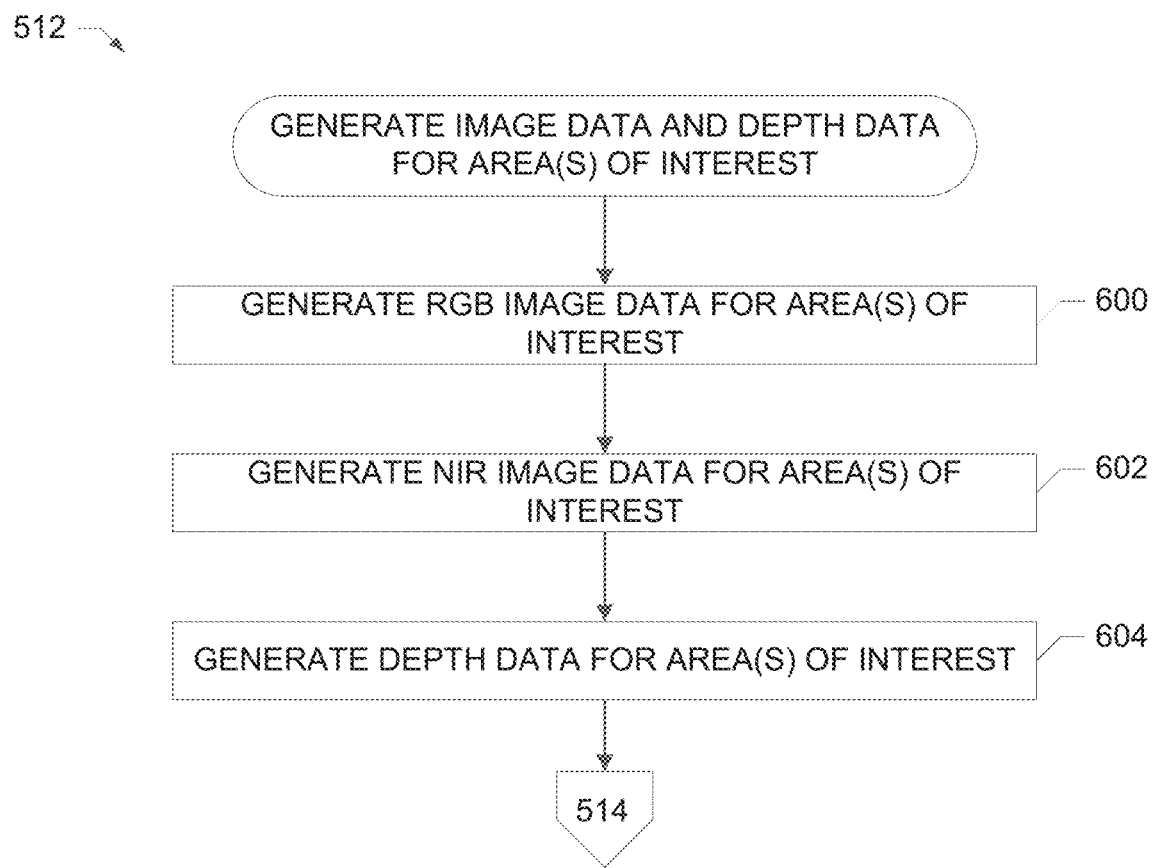
FIG. 6 is a flowchart representative of example machine readable instructions that may be executed to implement block 512 of FIG. 5.

FIG. 6 is a flowchart representative of example machine readable instructions that may be executed to implement block 512 of FIG. 5 to generate image data and depth data for one or more areas of interest (e.g., the area(s) 104 of FIGS. 1 and 2) via one or more UAV(s) (e.g., the UAV(s) 112, 114, 116) flying over the area(s). The example instructions 512 can be executed by the image data processor 314 of the camera(s) 120 of any of the UAV(s) 112, 114, 116. In some examples, multiple instances of the instructions of FIG. 6 are executed in parallel by the same or different component(s) of the system.

In the example of FIG. 6, the RGB sensor(s) 300 of the camera(s) 120 generate RGB image data of the area(s) of interest (block 600). The RGB sensor(s) 300 detect red, green, and/or blue wavelengths of light to generate RGB image data 308 as the UAV(s) 112, 114, 116 fly over the area(s) 104.

In the example of FIG. 6, the NIR sensor(s) 304 of the camera(s) 120 generate NIR image data of the area(s) of interest (block 602). The NIR sensor(s) 304 detect near-infrared wavelengths of light to generate NIR image data 310 for the area(s) 104 as the UAV(s) 112, 114, 116 fly over the area(s).

In the example of FIG. 6, the depth sensor(s) 306 generate depth data of the area(s) of interest (block 604). The depth sensor(s) 306 measure a distance of the camera 120 from a target, such as the ground of the area(s) 104 or the vegetation 106 in the area(s) 104 to generate depth data 312 for the area 104. After execution of block 604, control advances to block 514 of FIG. 5.

Figure 7:
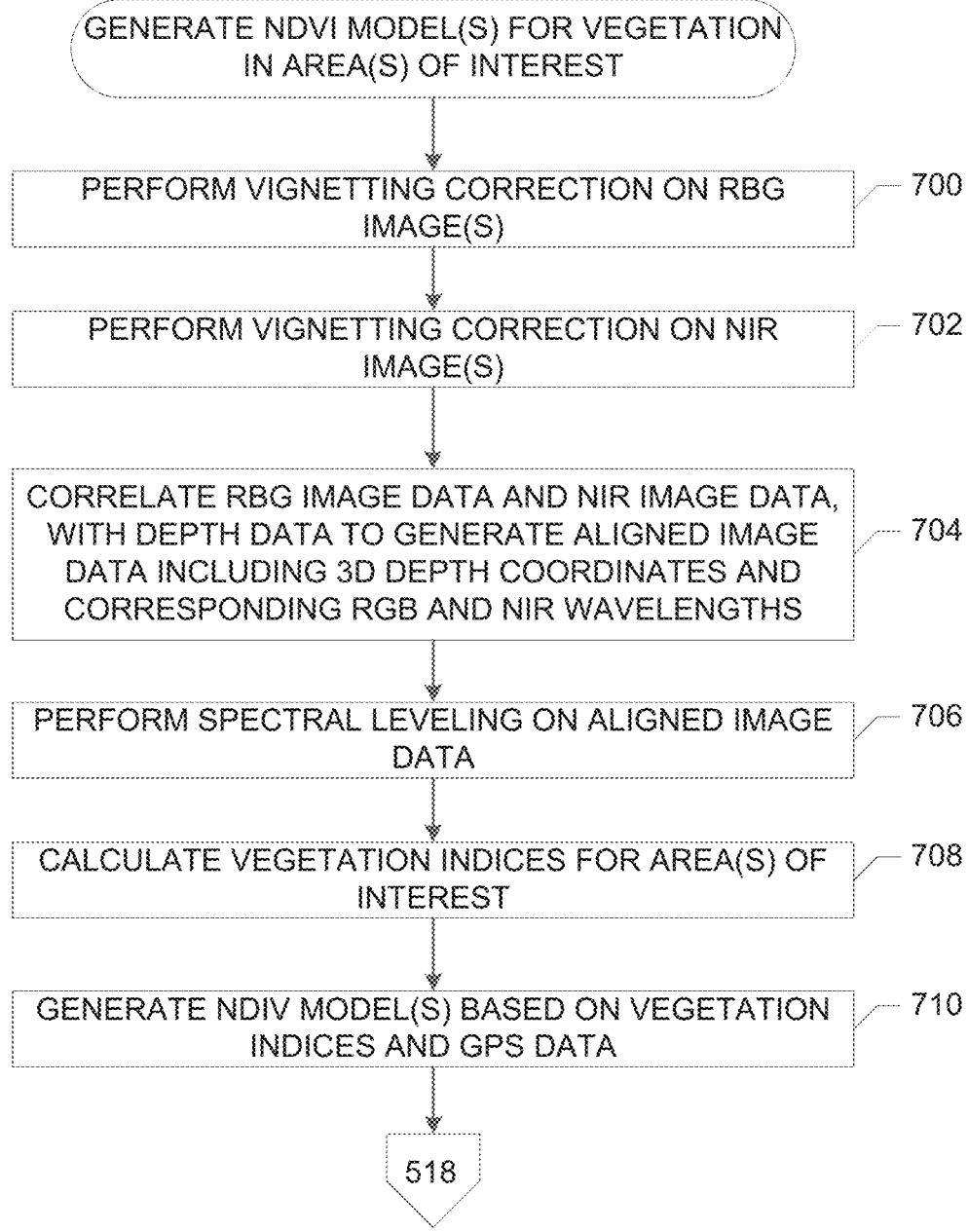
FIG. 7 is a flowchart representative of example machine readable instructions that may be executed to implement block 516 of FIG. 5.

FIG. 7 is a flowchart representative of example machine readable instructions that may be executed to implement block 516 of FIG. 5 to generate NDVI model(s) for vegetation in one or more areas of interest (e.g., the vegetation 106 in the area(s) 104 of FIGS. 1 and 2). The example instructions 516 can be executed by one or more of the dispersant controller 108 (e.g., of the vehicle 102), the image data processor(s) 314 of the camera(s) 120 of any or all of the respective first, second, or third UAVs 112, 114, 116, and/or the UAV controller 119 of any or all of the respective first, second, or third UAVs 112, 114, 116 of FIGS. 1-3. For ease of discussion, the following assumes the instructions as implemented by the image data processor(s) 314 and the UAV controller(s) 119. In some examples, multiple instances of the instructions of FIG. 7 are executed in parallel by the same or different component(s) of the system.

The image data processor(s) 314 of the camera(s) 120 of the UAV(s) 112, 114, 116 perform one or more data processing techniques on the RGB image data 308 and the NIR image data 310. In the example of FIG. 7, the image data processor(s) 314 perform vignetting correction of the RGB image data 308 (block 700). In the example of FIG. 7, the image data processor(s) 314 perform vignetting correction of the NIR image data 310 (block 702). The vignetting correction of the image data 308, 310 can include reducing a brightness and/or saturation of the image data.

In the example of FIG. 7, the image data processor(s) 314 of the camera(s) 120 of the UAV(s) 112, 114, 116 correlate the RGB image data 310, the NIR image data 310, and the depth data 312 generated by the depth sensor(s) 306 (block 704). Based on the correlation, the image data processor(s) 314 generate aligned image data 316 that includes 3-D coordinate data (e.g., based on the image data collected in the X-Y plane and the depth data collected in the Z plane) and corresponding spectral channels, namely, red, green, blue, and NIR wavelength values for the coordinates.

In the example of FIG. 7, the data generator(s) 322 of the UAV controller(s) of the UAV(s) 112, 114, 116 perform spectral leveling on the aligned image data 316 (block 706). The data generator(s) 322 scale or translate the pixel values in the aligned image data 316 to spectral measurements or energy levels indicative of the reflection of visible or near-infrared light (e.g., sunlight) by the vegetation 106. In some examples, the data generator(s) 322 use the camera configuration file 320 generated by the camera calibrator(s) 318 of the corresponding camera(s) 120 to correlate the pixel values of the RGB image data 308 and the NIR image data 310 with spectral energy values.

In the example of FIG. 7, the data generator(s) 322 of the UAV controller(s) 119 of the UAV(s) 112, 114, 116 calculate vegetation indices for the area(s) of interest (block 708). For example, the data generator(s) 322 calculate vegetation indices for each pixel value in the aligned image data 316 based on the spectral measurements determined from the image data 308, 310 generated by the RGB sensor(s) 300 and the NIR sensor(s) 304.

In the example of FIG. 7, the data generator(s) 322 of the UAV controller(s) 119 of the UAV(s) 112, 114, 116 generate NDVI model(s) of the vegetation 106 in the area 104 based on the vegetation indices and the GPS data (block 710). The data generator(s) 322 correlate the vegetation indices based on the pixel image data of the camera(s) 120 and the GPS data 326 to create one or more NDVI or vegetation landscape model 328 that visually depict the vegetation indices for the vegetation 106 of the area 104. The NDVI model(s) 328 can include 3-D or 2-D models. After completion of block 710, control advances to with block 518 of FIG. 5.

As discussed above, any of the example instructions 516 of FIG. 7 may be executed by the dispersant controller 108 of the vehicle 102. For example, the dispersant controller 108 can calculate the vegetation indices for the area(s) of interest and generate the NDVI model(s) based on processed image data received from the UAV(s).

Figure 8:
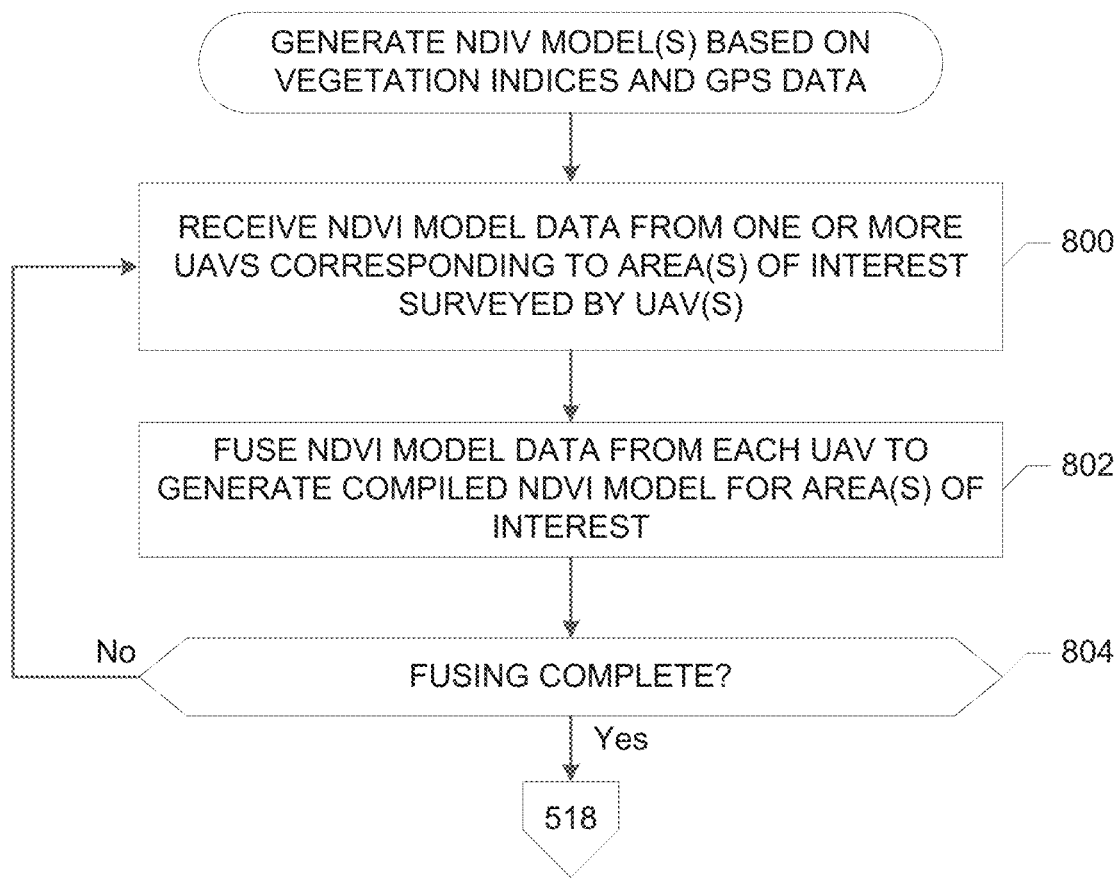
FIG. 8 is a flowchart representative of example machine readable instructions that may be executed to implement block 710 of FIG. 7.

FIG. 8 is a flowchart representative of example machine readable instructions 710 that may be executed to implement block 710 of FIG. 7 to generate NDVI model(s) based on vegetation indices and GPS data. The example instructions 710 can be executed by the dispersant controller 108 (e.g., of the vehicle 102) and/or the UAV controller 119 of any or all of the respective first, second, or third UAVs 112, 114, 116 of FIGS. 1-3. For ease of discussion, the following assumes the instructions of FIG. 8 are executed in one or more of the UAV(s). In some examples, multiple instances of the instructions of FIG. 8 are executed in parallel by the same or different component(s) of the system.

In the example of FIG. 8, the UAV communicator 118 of one of the UAVs 112, 114, 116 receives NDVI model data and GPS data from one or more other UAVs 112, 114, 116 corresponding to the area(s) of interest surveyed by the UAV(s) (block 800). The NDVI model data can include vegetation indices calculated by the UAV(s) 112, 114, 116 that can be used to create one or more point clouds, or visual representations of the vegetation indices in the area(s) 104. In other examples, the NDVI model data includes point cloud image data (e.g., 3-D image data) generated by the UAV(s) 112, 114, 116. For example, the second UAV 114 can be activated to survey the second portion 202 of the area 104 (e.g., based on the flight plan determined in FIG. 5). The NDVI model data can include GPS data indicative of a position of the UAV(s) when the corresponding image data was collected. The UAV communicator 118 of the first UAV 112 can receive NDVI model data from the second UAV 114 corresponding to image data collected by the second UAV 114 for the second portion 202 of the area 104 of FIG. 2. The data can be transmitted between the UAV(s) 112, 114, 116 via one or more wireless transmission protocols.

The data generator 322 of the UAV 112, 114, 116 fuses the received NDVI model data from the UAV(s) 112, 114, 116 to generate an NDVI model (e.g., a 3-D point cloud) for the area of interest (block 802). More specifically, in some examples, the data generator 322 combines the NDVI model data corresponding to different portions of an area 104 (e.g., the portions 200, 202) to generate an NDVI model for all or substantially all of the portions of the area 104 over which the UAV(s) 112, 114, 116 fly. For example, the data generator 322 of the UAV designated to perform the fusing (e.g., UAV 114) may take a median or average of the vegetation indices determined by the respective UAV(s) 112, 114, 116 to generate the NDVI model. In other examples, the data generator 322 may average pixel values in point cloud image data generated by the UAV(s) 112, 114, 116 that correspond to shared coverage portion(s) of the area 104, etc.

At block 804, the NDVI data generator 322 determines whether fusing of the NDVI model data is complete (block 804). If fusing is not complete, control returns to block 800 to continue receiving and fusing NDVI model data. When fusing is complete, the example instructions of FIG. 8 end and control returns to block 518.

Although the example instructions 710 of FIG. 8 are discussed above as implemented by a UAV controller 119 of one of the UAV(s) 112, 114, 116, one or more of the instructions of FIG. 8 can alternatively be implemented by the example dispersant controller 108 of the vehicle 102 of FIG. 1 and/or in other one(s) of the UAV(s). For example, the UAV(s) 112, 114, 116 can transmit the NDVI model data (e.g., vegetation indices, GPS data, 3-D point cloud image data) to the dispersant controller 108 (e.g., in substantially real-time as the data is generated) from the respective UAV(s). The dispersant controller 108 can fuse the data received from the UAV(s) to generate NDVI model(s) at the vehicle 102. Thus, in some examples, data generated by the UAV(s) is consolidated at the vehicle 102.

Figure 9:
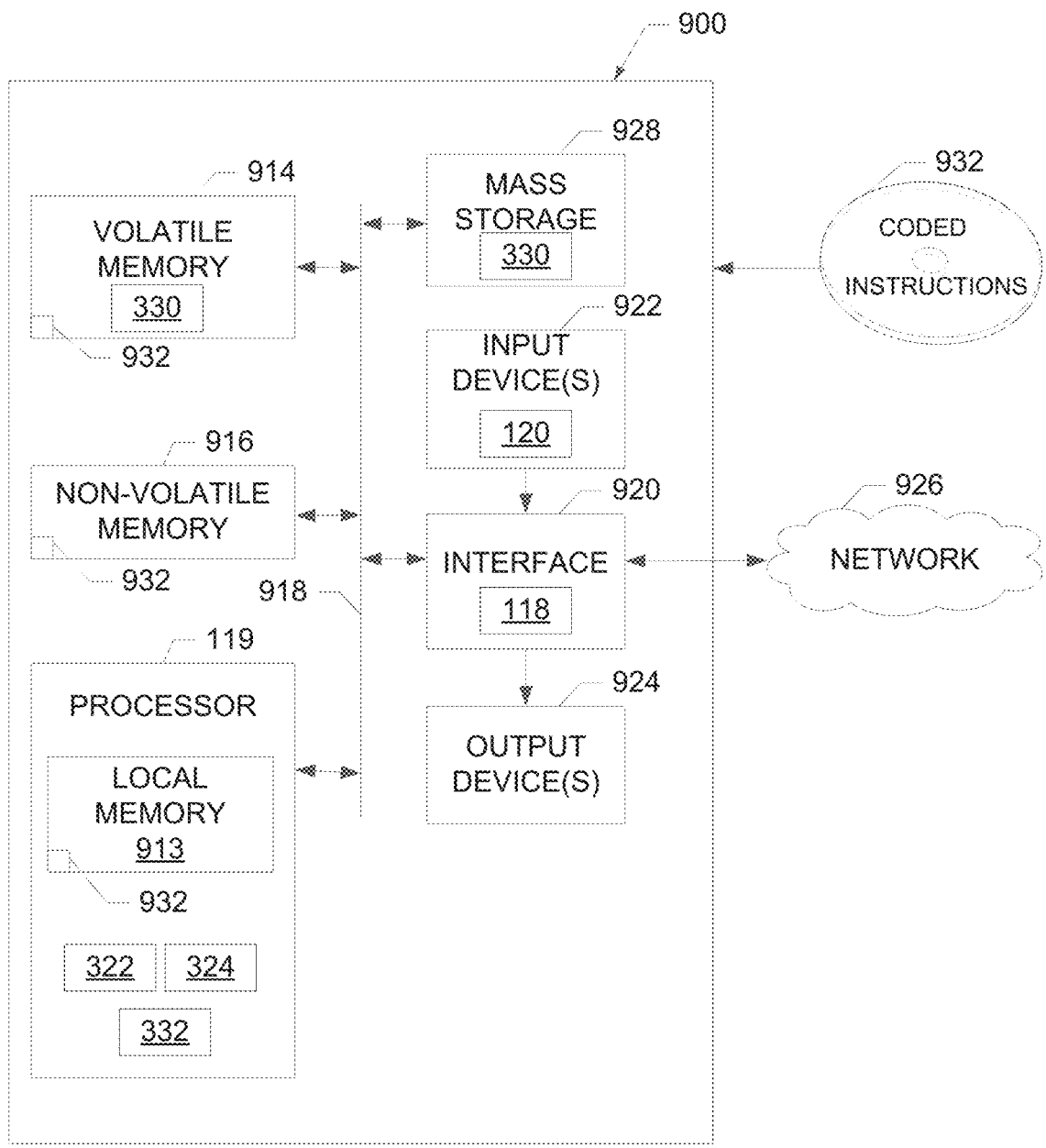
FIG. 9 is a block diagram of an example processor platform constructed to execute the example instructions of FIG. 5, FIG. 6, FIG. 7, and/or FIG. 8 to implement the example system and/or the example unmanned aerial vehicle of FIGS. 1-3.

FIG. 9 is a block diagram of an example processor platform 900 structured to execute the instructions of FIGS. 5, 6, 7, and/or 8 to implement the example UAV communicator 118, the example UAV controller 119, the example data generator 322, the example GPS tracker 324, the example UAV feedback analyzer 332, the example camera 120, the example RGB sensor(s) 300, the example NIR sensor(s) 304, the example depth sensor(s) 306, the example image data processor 314, the example camera calibrator 318, and/or, more generally, the example UAV(s) 112, 114, 116 of FIGS. 1-3. The processor platform 900 can be, for example, a printed circuit board with appropriate logic, a server, a personal computer, an ASIC or any other type of computing device.

The processor platform 900 of the illustrated example includes a processor implementing the UAV controller 119. The processor 119 of the illustrated example is hardware. For example, the processor 119 can be implemented by one or more integrated circuits, logic circuits, microprocessors or controllers from any desired family or manufacturer. The hardware processor may be a semiconductor based (e.g., silicon based) device. In this example, the processor 119 implements the example data generator 322, the example GPS tracker 324, and the example UAV feedback analyzer 332.

The processor 119 of the illustrated example includes a local memory 913 (e.g., a cache). The processor 119 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller. The database 330 of the processor 119 may be implemented by the main memory 914, 916 and/or the local memory 913.

The processor platform 900 of the illustrated example also includes an interface circuit 920. The interface circuit 920 may be implemented by any type of interface standard, such as an Ethernet interface, a universal serial bus (USB), and/or a PCI express interface. Some or all of the database 330 may be stored in mass storage 928.

In the illustrated example, one or more input devices 922 are connected to the interface circuit 920. The input device(s) 922 permit(s) a user to enter data and commands into the processor 119. The input device(s) can be implemented by, for example, an audio sensor, a microphone, a camera (still or video) 120, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a touchscreen, a tactile output device, and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.). In this example, the UAV communicator 118 is implemented by the interface circuit 920.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5, 6, 7, and/or 8 may be stored in the mass storage device 928, in the volatile memory 914, in the non-volatile memory 916, and/or on a removable tangible computer readable storage medium such as a CD or DVD.

Figure 10:
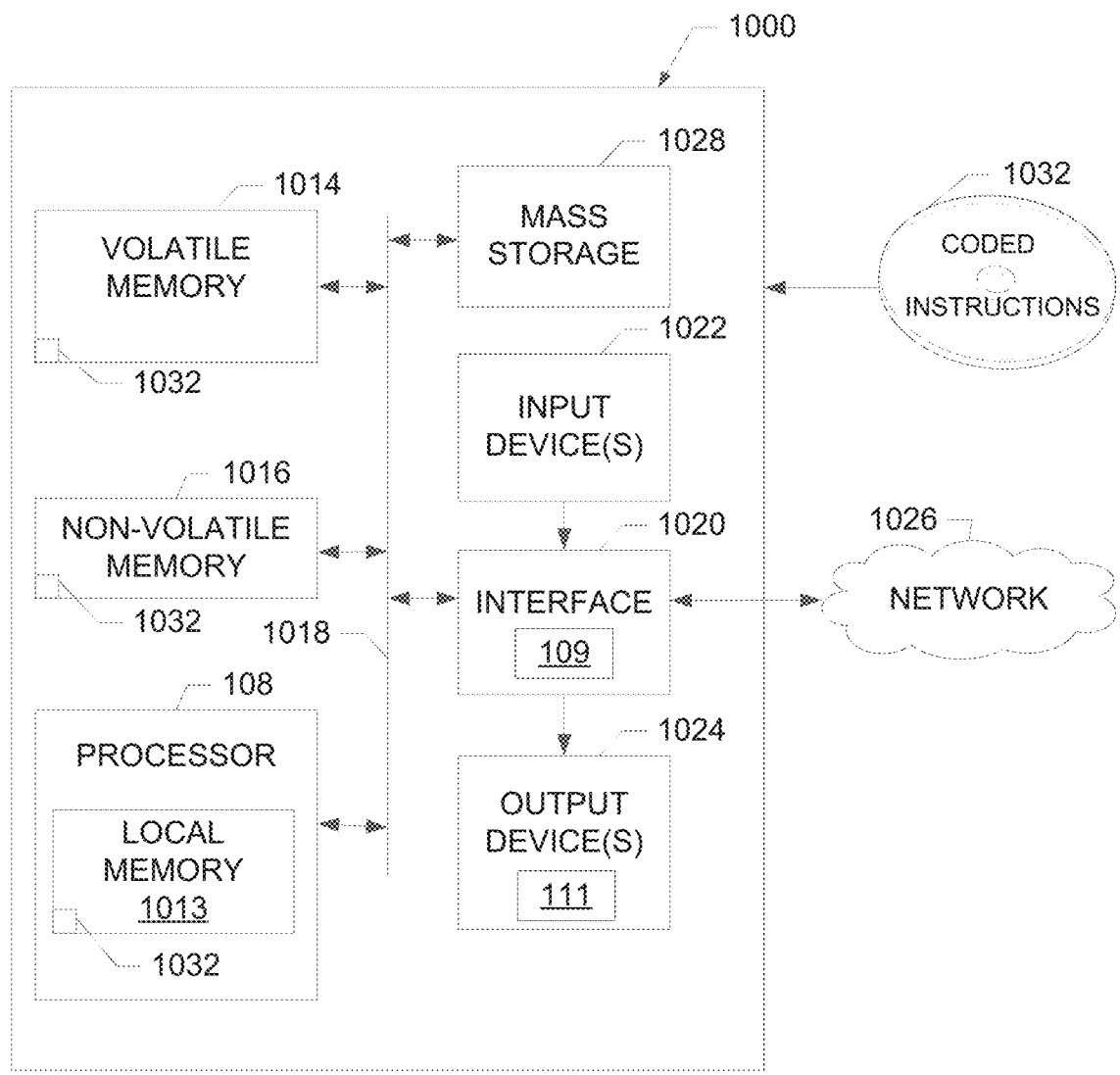
FIG. 10 is a block diagram of an example processor platform constructed to execute the example instructions of FIG. 5, FIG. 7, and/or FIG. 8 to implement the example system of FIGS. 1-3.

FIG. 10 is a block diagram of an example processor platform 1000 structured to execute the instructions of FIGS. 5, 7, and/or 8 to implement the example vehicle communicator 109, the example dispersant controller 108, and/or the example graphical user interface 111 at, for example, the example vehicle 102 of FIGS. 1-3. The processor platform 1000 can be, for example, a printed circuit board with appropriate logic, a server, a personal computer, an ASIC or any other type of computing device.

The processor platform 1000 of the illustrated example includes a processor implementing the dispersant controller 108. The processor 108 of the illustrated example is hardware. For example, the processor 108 can be implemented by one or more integrated circuits, logic circuits, microprocessors or controllers from any desired family or manufacturer. The hardware processor may be a semiconductor based (e.g., silicon based) device.

The processor 108 of the illustrated example includes a local memory 1013 (e.g., a cache). The processor 108 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 108. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a touchscreen, a tactile output device, and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In this example, the vehicle communicator 109 is implemented by the interface circuit 1020.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 5, 7, and/or 8 may be stored in the mass storage device 1028, in the volatile memory 1014, in the non-volatile memory 1016, and/or on a removable tangible computer readable storage medium such as a CD or DVD.

From the foregoing, it will be appreciated that methods, systems, and apparatus have been disclosed to generate NDVI models based on image data collected via one or more unmanned aerial vehicles or UAVs flying over an area of interest. Disclosed examples use image data and depth data generated via camera(s) of respective unmanned aerial vehicle(s) and create an NDVI or vegetation landscape model (e.g., a 3-D model) that is wirelessly transmitted to a vehicle in or near the area of interest in substantially real-time. The NDVI models generated using examples disclosed herein provide for more accurate representations of the growth state of the vegetation in or near the area and more precise determinations of locations at which agricultural treatment material(s) should be applied to vegetation as compared to, for example, historical data. Thus, disclosed examples provide for efficient distribution of agricultural treatment material(s) based on current information about the condition of the vegetation in an area of interest.

The following is a non-exclusive list of examples disclosed herein. Other examples may be included above. In addition, any of the examples disclosed herein can be considered in whole or in part, and/or modified in other ways.

Example 1 includes an unmanned aerial vehicle including a communicator to receive an instruction to request the unmanned aerial vehicle to fly over an area of interest, the instruction from a vehicle in the area of interest; a camera to generate image data for the area of interest; and a data generator to generate a vegetation landscape model of the area of interest based on the image data, the communicator to communicate the vegetation landscape model to the vehicle.

Example 2 includes the unmanned aerial vehicle as defined in example 1, wherein the camera includes a first sensor to generate first image data and a second sensor to generate second image data, the data generator to generate the vegetation landscape model by aligning the first image data and the second image data.

Example 3 includes the unmanned aerial vehicle as defined in example 2, wherein the first sensor is a red-green-blue sensor and the second sensor is a near-infrared sensor.

Example 4 includes the unmanned aerial vehicle as defined in example 2, further including an image data processor to perform vignette correction of at least one of the first image data or the second image data.

Example 5 includes the unmanned aerial vehicle as defined in example 2, wherein the camera includes a third sensor to generate depth data indicative of a height of the unmanned aerial vehicle relative to the area of interest, the data generator to generate the vegetation landscape model by aligning the first image data, the second image data, and the depth data.

Example 6 includes the unmanned aerial vehicle as defined in example 1, wherein the data generator is to determine a plurality of vegetation indices for the area of interest based on the image data, the data generator to generate the vegetation landscape model based on the vegetation indices.

Example 7 includes the unmanned aerial vehicle as defined in example 6, wherein the data generator is to determine respective ones of the vegetation indices based on respective pixel values of the image data.

Example 8 includes the unmanned aerial vehicle as defined in example 7, wherein the data generator is to correlate the pixel values to respective spectral energy levels, the data generator to determine the vegetation indices based on the spectral energy levels.

Example 9 includes the unmanned aerial vehicle as defined in 8, wherein the data generator is to correlate the pixel values to the respective spectral energy levels based on calibration data.

Example 10 includes the unnamed aerial vehicle as defined in examples 1 or 2, wherein the vegetation landscape model indicates an amount of vegetation in the area of interest.

Example 11 includes the unmanned aerial vehicle as defined in examples 1, 2, or 6, further including a global positioning system tracker to generate location data for the unmanned aerial vehicle.

Example 12 includes the unmanned aerial vehicle as defined in example 11, wherein the data generator is to generate the vegetation landscape model based on the location data.

Example 13 includes the unmanned aerial vehicle as defined in example 1, wherein the area of interest includes a first portion and a second portion, the camera is to generate image data for the first portion, the communicator is to access image data for the second portion, and the data generator is to generate the vegetation landscape model based on the image data for the first portion and the image data for the second portion.

Example 14 includes a method including collecting image data with an unmanned aerial vehicle flying over an area of interest; generating, by executing an instruction with at least one processor, a vegetation landscape model of the area of interest based on the image data; and communicating the vegetation landscape model to a vehicle to treat the area of interest.

Example 15 includes the method as defined in example 14, wherein the collecting of the image data includes: generating first image data via a first sensor; generating second image data via a second sensor; and aligning the first image data and the second image data to generate the vegetation landscape model.

Example 16 includes the method as defined in example 15, wherein the first image data is red-green-blue image data and the second image data is near-infrared image data.

Example 17 includes the method as defined in example 15, further including performing vignette correction of at least one of the first image data or the second image data.

Example 18 includes the method as defined in example 15, further including generating depth data indicative of a height of the unmanned aerial vehicle relative to the area of interest; and aligning the first image data, the second image data, and the depth data to generate the vegetation landscape model.

Example 19 includes the method as defined in example 14, further including determining a plurality of vegetation indices for the area of interest based on the image data, the generating of the vegetation landscape model based on the vegetation indices.

Example 20 includes the method as defined in example 19, further including determining respective ones of the vegetation indices based on respective pixel values of the image data.

Example 21 includes the method as defined in example 20, further including correlating the pixel values to respective spectral energy levels, the determining of the vegetation indices to be based on the spectral energy levels.

Example 22 includes the method as defined in example 21, wherein the correlating of the respective pixel values to the respective spectral energy levels is based on calibration data.

Example 23 includes the method as defined in examples 14 or 15, wherein the vegetation landscape model indicates an amount of vegetation in the area of interest.

Example 24 includes the method as defined in examples 14, 15, or 19, further including generating location data for the unmanned aerial vehicle.

Example 25 includes the method as defined in example 24, wherein the generating of the vegetation landscape model is based on the location data.

Example 26 includes the method as defined in example 25, further including determining a landing location for the unmanned aerial vehicle based on the location data and the image data.

Example 27 includes the method as defined in example 14, wherein the area of interest includes a first portion and a second portion, the image data is image data for the first portion, and further including accessing image data for the second portion, wherein the generating of the vegetation landscape model is based on the image data for the first portion and the image data for the second portion.

Example 28 includes at least one non-transitory computer readable medium including instructions that, when executed, cause at least one unmanned aerial vehicle to at least generate image data for an area of interest while flying over the area of interest; generate a vegetation landscape model of the area of interest based on the image data; and communicate the vegetation landscape model in substantially real-time to a vehicle to service the area of interest.

Example 29 includes the at least one non-transitory computer readable storage medium as defined in example 28, wherein the image data includes first image data and second image data and the instructions to cause the at least one unmanned aerial vehicle to generate the vegetation landscape model by aligning the first image data and the second image data.

Example 30 includes the at least one non-transitory computer readable storage medium as defined in example 29, wherein the first image data is red-green-blue image data and the second image data is near-infrared image data.

Example 31 includes the at least one non-transitory computer readable storage medium as defined in example 29, wherein the instructions further cause the at least one unmanned aerial vehicle to perform vignette correction of at least one of the first image data or the second image data.

Example 32 includes the at least one non-transitory computer readable storage medium as defined in example 29, wherein the instructions further cause the at least one unmanned aerial vehicle to detect a height of the at least one unmanned aerial vehicle relative to the area of interest; generate depth data based on the detection; and align the first image data, the second image data, and the depth data to generate the vegetation landscape model.

Example 33 includes the at least one non-transitory computer readable storage medium as defined in example 28, wherein the instructions further cause the at least one unmanned aerial vehicle to determine a plurality of vegetation indices for the area of interest based on the image data and to generate the vegetation landscape model based on the vegetation indices.

Example 34 includes the at least one non-transitory computer readable storage medium as defined in example 33, wherein the instructions further cause the at least one unmanned aerial vehicle to calculate respective ones of the vegetation indices based on respective pixel values of the image data.

Example 35 includes the at least one non-transitory computer readable storage medium as defined in example 34, wherein the instructions further cause the at least one unmanned aerial vehicle to correlate the pixel values to respective spectral energy levels and to determine the vegetation indices based on the spectral energy levels.

Example 36 includes the at least one non-transitory computer readable storage medium as defined in example 34, wherein the instructions further cause the at least one unmanned aerial vehicle to correlate the pixel values to the respective spectral energy levels based on calibration data.

Example 37 includes the at least one non-transitory computer readable storage medium as defined in examples 28 or 29, wherein the vegetation landscape model indicates an amount of vegetation in the area of interest.

Example 38 includes the at least one non-transitory computer readable storage medium as defined in examples 28, 29, or 33, wherein the instructions further cause the at least one unmanned aerial vehicle to generate location data.

Example 39 includes the at least one non-transitory computer readable storage medium as defined in example 38, wherein the instructions further cause the at least one unmanned aerial vehicle to generate the vegetation landscape model based on the location data.

Example 40 includes the at least one non-transitory computer readable storage medium as defined in example 38, wherein the instructions further cause the at least one unmanned aerial vehicle to determine a landing location based on the location data and the image data.

Example 41 includes the at least one non-transitory computer readable storage medium as defined in example 28, wherein the area of interest includes a first portion and a second portion and the image data is image data for the first portion and the instructions further cause the at least one unmanned aerial vehicle to: access image data for the second portion; and generate the vegetation landscape model based on the image data for the first portion and the image data for the second portion.

Example 42 includes an unmanned aerial vehicle including means for generating image data for an area of interest in response to receiving an instruction to fly over an area of interest from a vehicle; means for generating a vegetation landscape model of the area of interest based on the image data; and means for communicating the vegetation landscape model to the vehicle.

Example 43 includes the unmanned aerial vehicle as defined in example 42, wherein the means for generating the image data includes a first sensor to detect first image data and a second sensor to detect second image data; and means for correlating the first image data and the second image data.

Example 44 includes the unmanned aerial vehicle as defined in example 42, wherein the means for generating the vegetation landscape model is to determine vegetation indices for the area of interest based on the image data.

Example 45 includes the unmanned aerial vehicle as defined in example 42, wherein the means for generating the image data includes means for detecting height of the unmanned aerial vehicle above vegetation in the area of interest, the means for generating the vegetation landscape model to generate the vegetation landscape model based on the height.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An unmanned aerial vehicle comprising:
a communicator to receive an instruction to request the unmanned aerial vehicle to fly over an area of interest, the instruction from a vehicle in the area of interest;
a camera including a first sensor to generate image data for the area of interest and a second sensor to generate depth data indicative of a height of the unmanned aerial vehicle relative to the area of interest; and
a data generator to:
align the image data and the depth data to generate aligned data, the aligned data including coordinate data based on the depth data and corresponding spectral channel values based on the image data; and
generate a vegetation landscape model of the area of interest based on the aligned data, the communicator to communicate the vegetation landscape model to the vehicle.

2. The unmanned aerial vehicle as defined in claim 1, wherein the image data is first image data and the camera includes a third sensor, the third sensor to generate second image data, the data generator to align the first image data, the second image data, and the depth data to generate the aligned data.

3. The unmanned aerial vehicle as defined in claim 2, further including an image data processor to perform vignette correction of at least one of the first image data or the second image data.

4. The unmanned aerial vehicle as defined in claim 2, wherein the first sensor includes a red-green-blue sensor and the second sensor includes a near-infrared sensor.

5. The unmanned aerial vehicle as defined in claim 1, wherein the data generator is to determine a plurality of vegetation indices for the area of interest based on the image data, the data generator to generate the vegetation landscape model based on the vegetation indices.

6. The unmanned aerial vehicle as defined in claim 5, wherein the data generator is to determine respective ones of the vegetation indices based on respective pixel values of the image data.

7. The unmanned aerial vehicle as defined in claim 6, wherein the data generator is to correlate the pixel values to respective spectral energy levels, the data generator to determine the vegetation indices based on the spectral energy levels.

8. The unmanned aerial vehicle as defined in claim 1, wherein the vegetation landscape model indicates an amount of vegetation in the area of interest.

9. The unmanned aerial vehicle as defined in claim 1, wherein the area of interest includes a first portion and a second portion, the image data is first image data, the first sensor is to generate the first image data for the first portion, the communicator is to access second image data for the second portion, and the data generator is to generate the vegetation landscape model based on the first image data for the first portion and the second image data for the second portion.

10. An unmanned aerial vehicle comprising:
means for generating image data for an area of interest in response to receiving an instruction to fly over the area of interest from a vehicle;
means for generating depth data indicative of a height of the unmanned aerial vehicle relative to the area of interest;
means for generating a vegetation landscape model of the area of interest, the vegetation landscape model generating means to:
align the image data and the depth data to generate aligned data, the aligned data including coordinate data based on the depth data and corresponding spectral channel values based on the image data; and
generate the vegetation landscape model based on the aligned data; and
means for communicating the vegetation landscape model to the vehicle.

11. The unmanned aerial vehicle as defined in claim 10, wherein the means for generating the image data includes:
a first sensor to detect first image data and a second sensor to detect second image data; and,
means for correlating the first image data and the second image data.

12. The unmanned aerial vehicle as defined in claim 11, wherein the first sensor includes a red-green-blue sensor and the second sensor includes a near-infrared sensor.

13. The unmanned aerial vehicle as defined in claim 10, wherein the means for generating the vegetation landscape model is to determine vegetation indices for the area of interest based on the image data.

14. At least one non-transitory computer readable storage medium, comprising instructions that, when executed, cause at least one unmanned aerial vehicle to at least:
generate image data for an area of interest while flying over the area of interest;
generate depth data indicative of a height of the at least one unmanned aerial vehicle relative to the area of interest;
align the image data and the depth data to generate aligned data, wherein the aligned data includes coordinate data based on the depth data and corresponding spectral channel values based on the image data;
generate a vegetation landscape model of the area of interest based on the aligned data; and
communicate the vegetation landscape model in substantially real-time to a vehicle to service the area of interest.

15. The at least one non-transitory computer readable storage medium as defined in claim 14, wherein the image data includes first image data and second image data and the instructions, when executed, cause the at least one unmanned aerial vehicle to align the first image data, the second image data, and the depth data to generate the aligned data.

16. The at least one non-transitory computer readable storage medium as defined in claim 15, wherein the first image data is red-green-blue image data and the second image data is near-infrared image data.

17. The at least one non-transitory computer readable storage medium as defined in claim 15, wherein the instructions, when executed, cause the at least one unmanned aerial vehicle to perform vignette correction of at least one of the first image data or the second image data.

18. The at least one non-transitory computer readable storage medium as defined in claim 14, wherein the instructions, when executed, cause the at least one unmanned aerial vehicle to determine a plurality of vegetation indices for the area of interest based on the image data and to generate the vegetation landscape model based on the vegetation indices.

19. The at least one non-transitory computer readable storage medium as defined in claim 18, wherein the instructions, when executed, cause the at least one unmanned aerial vehicle to calculate respective ones of the vegetation indices based on respective pixel values of the image data.

* * * * *

UNITED STATES PATENT AND TRADEMARK OFFICE
CERTIFICATE OF CORRECTION

PATENT NO. : 10,901,420 B2
APPLICATION NO. : 15/803141
DATED : January 26, 2021
INVENTOR(S) : Markus Achtelik et al.

Page 1 of 1

It is certified that error appears in the above-identified patent and that said Letters Patent is hereby corrected as shown below:

In the Claims

Claim 14, Column 28, Line 32:
Delete the "," after the word --medium--.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*